United States Patent
Hassan et al.

(10) Patent No.: US 9,450,995 B2
(45) Date of Patent: Sep. 20, 2016

(54) DIRECT CONNECTION WITH SIDE CHANNEL CONTROL

(71) Applicant: Microsoft Corporation, Redmond, WA (US)

(72) Inventors: Amer A. Hassan, Kirkland, WA (US); Billy R. Anders, Jr., Bothell, WA (US); Kurt M. Hunter, Sammamish, WA (US); Brian Larsen, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/333,386

(22) Filed: Jul. 16, 2014

(65) Prior Publication Data

US 2014/0328251 A1 Nov. 6, 2014

Related U.S. Application Data

(63) Continuation of application No. 12/967,638, filed on Dec. 14, 2010, now Pat. No. 8,792,429.

(51) Int. Cl.
*H04L 29/06* (2006.01)
*H04L 12/28* (2006.01)
(Continued)

(52) U.S. Cl.
CPC .......... *H04L 65/4069* (2013.01); *G08C 17/02* (2013.01); *H04L 12/2818* (2013.01);
(Continued)

(58) Field of Classification Search
CPC .................................................. H04L 65/4069
USPC .................................................. 370/329, 328
See application file for complete search history.

(56) References Cited

U.S. PATENT DOCUMENTS

| 4,949,299 A | 8/1990 | Pickett |
| 5,682,382 A | 10/1997 | Shepard |

(Continued)

FOREIGN PATENT DOCUMENTS

| CN | 1571341 A | 1/2005 |
| CN | 1592210 A | 3/2005 |

(Continued)

OTHER PUBLICATIONS

Menezes, Pascal; "Operating System Supporting Cost Aware Applications"; U.S. Appl. No. 14/318,380, filed Mar. 16, 2013; 56 pages.

(Continued)

*Primary Examiner* — Parth Patel
(74) *Attorney, Agent, or Firm* — Sunah Lee; Judy Yee; Micky Minhas

(57) ABSTRACT

A wireless computer that pairs with a remote audio-video presentation device, such as a television. As a result of the pairing, a communication channel is established for the computer to transmit audio-video content for presentation through that device. Additionally, as part of the pairing, the computer and remote device select a side channel for communication of user commands. The wireless computer may display a user interface through which a user may input commands that control the manner in which the remote audio-video device presents the content. As a result, a user may use the wireless computer as a remote control for the audio-video device, controlling both the content presented and the manner in which it is presented. The side channel may use different frequencies than the channel used to communicate audio-video content, and may use very low power at frequencies in the digital TV spectrum.

20 Claims, 10 Drawing Sheets

(51) Int. Cl.
*H04N 21/63* (2011.01)
*G08C 17/02* (2006.01)
*H04W 76/02* (2009.01)
*H04W 84/10* (2009.01)
*H04W 88/06* (2009.01)

(52) U.S. Cl.
CPC ....... *H04L12/2838* (2013.01); *H04L 65/1093* (2013.01); *H04L 65/4092* (2013.01); *H04N 21/632* (2013.01); *H04L 2012/2841* (2013.01); *H04L 2012/2849* (2013.01); *H04W 76/023* (2013.01); *H04W 84/10* (2013.01); *H04W 88/06* (2013.01)

(56) References Cited

U.S. PATENT DOCUMENTS

| | | | |
|---|---|---|---|
| 5,729,682 A | 3/1998 | Marquis et al. | |
| 5,963,915 A | 10/1999 | Kirsch | |
| 5,966,441 A | 10/1999 | Calamera | |
| 6,288,749 B1 | 9/2001 | Freadman | |
| 6,317,490 B1 | 11/2001 | Cameron et al. | |
| 6,338,046 B1 | 1/2002 | Saari et al. | |
| 6,343,205 B1 | 1/2002 | Threadgill et al. | |
| 6,553,060 B2 | 4/2003 | Souissi et al. | |
| 6,628,965 B1 | 9/2003 | Larosa et al. | |
| 6,665,709 B1 | 12/2003 | Barron | |
| 6,711,617 B1 | 3/2004 | Bantz et al. | |
| 6,789,228 B1 | 9/2004 | Merril et al. | |
| 6,823,379 B1 | 11/2004 | Heckel et al. | |
| 7,020,472 B2 | 3/2006 | Schmidt | |
| 7,027,808 B2 | 4/2006 | Wesby | |
| 7,058,696 B1 | 6/2006 | Phillips et al. | |
| 7,107,009 B2 | 9/2006 | Sairanen et al. | |
| 7,110,843 B2 | 9/2006 | Pagnano et al. | |
| 7,177,288 B2 | 2/2007 | Mooney et al. | |
| 7,194,278 B1 | 3/2007 | Cook | |
| 7,274,911 B2 | 9/2007 | Li | |
| 7,280,978 B1 | 10/2007 | Joao | |
| 7,290,132 B2 | 10/2007 | Aboba et al. | |
| 7,349,342 B2 | 3/2008 | Carpenter et al. | |
| 7,400,253 B2 | 7/2008 | Cohen | |
| 7,412,534 B2 | 8/2008 | Tsang et al. | |
| 7,461,253 B2 | 12/2008 | Braskich et al. | |
| 7,496,637 B2 | 2/2009 | Han et al. | |
| 7,512,401 B2 | 3/2009 | Muhonen et al. | |
| 7,558,604 B2 | 7/2009 | Narayanaswami et al. | |
| 7,562,129 B1 | 7/2009 | Lee et al. | |
| 7,577,125 B2 | 8/2009 | Abhishek et al. | |
| 7,580,678 B2 | 8/2009 | Byman-Kivivuori et al. | |
| 7,584,296 B2 | 9/2009 | Sun et al. | |
| 7,589,693 B2 | 9/2009 | Locke | |
| 7,640,213 B2 | 12/2009 | Reunert et al. | |
| 7,721,093 B2 | 5/2010 | Sundararajan | |
| 7,729,689 B2 | 6/2010 | Chakraborty et al. | |
| 7,751,317 B2 | 7/2010 | Toyama et al. | |
| 7,769,394 B1 | 8/2010 | Zhu | |
| 7,925,739 B2 | 4/2011 | Kocho et al. | |
| 7,962,854 B2 | 6/2011 | Vance et al. | |
| 8,014,415 B2 | 9/2011 | Alapuranen | |
| 8,095,111 B2 | 1/2012 | Henry, Jr. et al. | |
| 8,098,803 B1 | 1/2012 | Croak et al. | |
| 8,204,013 B2 | 6/2012 | Lewis | |
| 8,254,992 B1 | 8/2012 | Ashenbrenner et al. | |
| 8,260,998 B2 | 9/2012 | Ganesh et al. | |
| 8,285,250 B2 | 10/2012 | Rubin et al. | |
| 8,323,040 B2 | 12/2012 | Prest | |
| 8,326,958 B1 | 12/2012 | Raleigh | |
| 8,397,982 B2 | 3/2013 | Slaby et al. | |
| 8,437,736 B2 | 5/2013 | Rubin et al. | |
| 8,565,928 B2* | 10/2013 | Venkatakrishnan | G06Q 50/06 700/285 |
| 8,589,991 B2* | 11/2013 | Hassan | H04B 1/69 725/141 |
| 8,621,097 B2* | 12/2013 | Venkatakrishnan | G06Q 50/06 709/224 |
| 8,633,616 B2 | 1/2014 | Soar | |
| 8,659,565 B2 | 2/2014 | Sirpal et al. | |
| 8,977,731 B2* | 3/2015 | Venkatakrishnan | G06Q 10/06 700/286 |
| 2001/0021950 A1 | 9/2001 | Hawley et al. | |
| 2001/0037399 A1 | 11/2001 | Eylon et al. | |
| 2001/0042124 A1 | 11/2001 | Barron | |
| 2001/0046298 A1 | 11/2001 | Terada et al. | |
| 2002/0067268 A1 | 6/2002 | Lee et al. | |
| 2002/0116485 A1 | 8/2002 | Black et al. | |
| 2002/0120935 A1 | 8/2002 | Huber et al. | |
| 2002/0143819 A1 | 10/2002 | Han et al. | |
| 2002/0154751 A1 | 10/2002 | Thompson et al. | |
| 2002/0156876 A1 | 10/2002 | Hartman et al. | |
| 2003/0142651 A1 | 7/2003 | Matta et al. | |
| 2003/0187992 A1 | 10/2003 | Steenfeldt et al. | |
| 2003/0231586 A1 | 12/2003 | Chheda | |
| 2004/0002305 A1 | 1/2004 | Byman-Kivivuori et al. | |
| 2004/0006606 A1 | 1/2004 | Marotta et al. | |
| 2004/0049576 A1 | 3/2004 | Schweitzer et al. | |
| 2004/0061716 A1 | 4/2004 | Cheung et al. | |
| 2004/0174395 A1 | 9/2004 | Liu | |
| 2004/0198374 A1 | 10/2004 | Bajikar | |
| 2004/0203815 A1 | 10/2004 | Shoemake et al. | |
| 2004/0210320 A1 | 10/2004 | Pandya | |
| 2004/0260630 A1 | 12/2004 | Benco et al. | |
| 2005/0028208 A1 | 2/2005 | Ellis et al. | |
| 2005/0071319 A1 | 3/2005 | Kelley et al. | |
| 2005/0083975 A1 | 4/2005 | Macri | |
| 2005/0105632 A1 | 5/2005 | Catreux-Erces et al. | |
| 2005/0135235 A1 | 6/2005 | Maruyama et al. | |
| 2005/0177715 A1 | 8/2005 | Somin et al. | |
| 2005/0198238 A1 | 9/2005 | Sim et al. | |
| 2005/0221844 A1 | 10/2005 | Trethewey et al. | |
| 2005/0223226 A1 | 10/2005 | Sundararajan | |
| 2005/0229246 A1 | 10/2005 | Rajagopal et al. | |
| 2005/0249266 A1 | 11/2005 | Brown et al. | |
| 2006/0015904 A1 | 1/2006 | Marcus | |
| 2006/0041916 A1 | 2/2006 | Mcquaide | |
| 2006/0059462 A1 | 3/2006 | Yamamoto | |
| 2006/0107036 A1 | 5/2006 | Randle et al. | |
| 2006/0143027 A1 | 6/2006 | Jagannathan et al. | |
| 2006/0145815 A1 | 7/2006 | Lanzieri et al. | |
| 2006/0171304 A1 | 8/2006 | Hill et al. | |
| 2006/0239208 A1 | 10/2006 | Roberts et al. | |
| 2006/0290519 A1 | 12/2006 | Boate et al. | |
| 2006/0294112 A1 | 12/2006 | Mandato et al. | |
| 2007/0054616 A1 | 3/2007 | Culbert | |
| 2007/0057793 A1 | 3/2007 | Alden | |
| 2007/0064604 A1 | 3/2007 | Chen et al. | |
| 2007/0124485 A1 | 5/2007 | Frost et al. | |
| 2007/0153695 A1 | 7/2007 | Gholmieh et al. | |
| 2007/0153729 A1 | 7/2007 | Alapuranen | |
| 2007/0161411 A1 | 7/2007 | Liao et al. | |
| 2007/0171915 A1 | 7/2007 | Toyama et al. | |
| 2007/0192735 A1 | 8/2007 | Lehto et al. | |
| 2007/0207750 A1 | 9/2007 | Brown et al. | |
| 2007/0223398 A1 | 9/2007 | Luo et al. | |
| 2007/0225831 A1 | 9/2007 | Sakurada | |
| 2007/0248179 A1 | 10/2007 | Hassan et al. | |
| 2007/0254628 A1 | 11/2007 | Rybak | |
| 2007/0271525 A1* | 11/2007 | Han | G06F 3/017 715/786 |
| 2007/0274488 A1 | 11/2007 | Callaghan | |
| 2007/0280332 A1 | 12/2007 | Srikanteswara et al. | |
| 2007/0280481 A1 | 12/2007 | Eastlake et al. | |
| 2008/0002658 A1 | 1/2008 | Soliman | |
| 2008/0016338 A1 | 1/2008 | Sun | |
| 2008/0055399 A1* | 3/2008 | Woodworth | H04L 67/306 348/14.12 |
| 2008/0055423 A1* | 3/2008 | Ying | G08B 13/19684 348/211.99 |
| 2008/0063204 A1 | 3/2008 | Braskich et al. | |
| 2008/0065238 A1 | 3/2008 | Igoe | |
| 2008/0081597 A1 | 4/2008 | Cole | |

(56) References Cited

U.S. PATENT DOCUMENTS

| | | |
|---|---|---|
| 2008/0104170 A1 | 5/2008 | Ananthanarayanan |
| 2008/0130519 A1 | 6/2008 | Bahl et al. |
| 2008/0130639 A1 | 6/2008 | Costa-Requena et al. |
| 2008/0132201 A1 | 6/2008 | Karlberg |
| 2008/0152098 A1 | 6/2008 | Paryzek et al. |
| 2008/0197802 A1 | 8/2008 | Onishi et al. |
| 2008/0207119 A1 | 8/2008 | Chang |
| 2008/0207128 A1 | 8/2008 | Mikko |
| 2008/0227384 A1 | 9/2008 | Placzek et al. |
| 2008/0252419 A1 | 10/2008 | Batchelor et al. |
| 2008/0275993 A1 | 11/2008 | Mohammed et al. |
| 2008/0293375 A1 | 11/2008 | Swanburg |
| 2008/0293419 A1 | 11/2008 | Somasundaram et al. |
| 2008/0311952 A1 | 12/2008 | Sugiyama |
| 2008/0319857 A1 | 12/2008 | Dobbins et al. |
| 2009/0011738 A1 | 1/2009 | Sasakura |
| 2009/0013175 A1 | 1/2009 | Elliott |
| 2009/0039828 A1 | 2/2009 | Jakubowski |
| 2009/0045913 A1 | 2/2009 | Nelson et al. |
| 2009/0055266 A1 | 2/2009 | Brody et al. |
| 2009/0089885 A1 | 4/2009 | Noble et al. |
| 2009/0100080 A1 | 4/2009 | Toms et al. |
| 2009/0103481 A1 | 4/2009 | Mahajan et al. |
| 2009/0106542 A1 | 4/2009 | Dubs et al. |
| 2009/0111378 A1 | 4/2009 | Sheynman et al. |
| 2009/0138715 A1 | 5/2009 | Xiao et al. |
| 2009/0144622 A1 | 6/2009 | Evans et al. |
| 2009/0154343 A1 | 6/2009 | Fitch et al. |
| 2009/0158394 A1 | 6/2009 | Oh et al. |
| 2009/0170431 A1 | 7/2009 | Pering et al. |
| 2009/0196180 A1 | 8/2009 | Bahl et al. |
| 2009/0210940 A1 | 8/2009 | Dean |
| 2009/0303902 A1 | 12/2009 | Liu et al. |
| 2009/0319663 A1 | 12/2009 | Giles et al. |
| 2010/0049971 A1 | 2/2010 | Oh |
| 2010/0056124 A1 | 3/2010 | Keating et al. |
| 2010/0081473 A1 | 4/2010 | Chatterjee et al. |
| 2010/0091965 A1 | 4/2010 | Ma et al. |
| 2010/0100637 A1 | 4/2010 | Bowra et al. |
| 2010/0103850 A1 | 4/2010 | Gossain et al. |
| 2010/0104078 A1 | 4/2010 | Henry, Jr. et al. |
| 2010/0110890 A1 | 5/2010 | Rainer et al. |
| 2010/0111033 A1 | 5/2010 | Erceg et al. |
| 2010/0115278 A1 | 5/2010 | Shen et al. |
| 2010/0121744 A1 | 5/2010 | Belz et al. |
| 2010/0144274 A1 | 6/2010 | Mcdowall et al. |
| 2010/0153762 A1 | 6/2010 | Radulescu et al. |
| 2010/0157167 A1 | 6/2010 | Lawther et al. |
| 2010/0175101 A1 | 7/2010 | Devictor et al. |
| 2010/0186066 A1 | 7/2010 | Pollard |
| 2010/0191576 A1 | 7/2010 | Raleigh |
| 2010/0191847 A1 | 7/2010 | Raleigh |
| 2010/0195580 A1 | 8/2010 | Samarasooriya et al. |
| 2010/0198952 A1 | 8/2010 | Kneckt et al. |
| 2010/0220856 A1 | 9/2010 | Kruys et al. |
| 2010/0226253 A1 | 9/2010 | Bugenhagen |
| 2010/0232332 A1 | 9/2010 | Abdel-Kader |
| 2010/0257251 A1 | 10/2010 | Mooring et al. |
| 2010/0284316 A1 | 11/2010 | Sampathkumar |
| 2010/0302005 A1 | 12/2010 | Popovski |
| 2010/0333032 A1 | 12/2010 | Lau et al. |
| 2011/0010433 A1 | 1/2011 | Wilburn et al. |
| 2011/0107388 A1 | 5/2011 | Lee et al. |
| 2011/0145581 A1 | 6/2011 | Malhotra et al. |
| 2011/0149806 A1 | 6/2011 | Verma et al. |
| 2011/0176463 A1 | 7/2011 | Cowan et al. |
| 2011/0188391 A1 | 8/2011 | Sella et al. |
| 2011/0188419 A1 | 8/2011 | Filoso et al. |
| 2011/0188420 A1 | 8/2011 | Filoso et al. |
| 2011/0202189 A1* | 8/2011 | Venkatakrishnan ... G06Q 50/06 700/286 |
| 2011/0230209 A1 | 9/2011 | Kilian |
| 2011/0238498 A1 | 9/2011 | Hassan et al. |
| 2011/0261001 A1 | 10/2011 | Liu |
| 2011/0274020 A1 | 11/2011 | Filoso et al. |
| 2011/0275316 A1 | 11/2011 | Suumaeki et al. |
| 2011/0280413 A1 | 11/2011 | Wu et al. |
| 2011/0293095 A1 | 12/2011 | Ben Ayed |
| 2011/0320963 A1 | 12/2011 | Wong |
| 2011/0321126 A1 | 12/2011 | Maniatopoulos |
| 2012/0101952 A1 | 4/2012 | Raleigh et al. |
| 2012/0139690 A1 | 6/2012 | Gupta et al. |
| 2012/0144083 A1 | 6/2012 | Hassan et al. |
| 2012/0147268 A1* | 6/2012 | Hassan ............... H04B 1/69 348/552 |
| 2012/0147274 A1 | 6/2012 | Hassan et al. |
| 2012/0147825 A1 | 6/2012 | Hassan et al. |
| 2012/0155643 A1 | 6/2012 | Hassan et al. |
| 2012/0157038 A1 | 6/2012 | Menezes et al. |
| 2012/0158839 A1 | 6/2012 | Hassan et al. |
| 2012/0158947 A1 | 6/2012 | Hassan et al. |
| 2012/0158981 A1 | 6/2012 | Desai et al. |
| 2012/0178429 A1 | 7/2012 | Camps Mur et al. |
| 2012/0197792 A1 | 8/2012 | Raleigh |
| 2013/0033800 A1 | 2/2013 | Bartnik et al. |
| 2013/0097422 A1 | 4/2013 | Salomone |
| 2013/0182614 A1 | 7/2013 | Kumar et al. |
| 2013/0322846 A1* | 12/2013 | Ferren ............... G06K 9/3266 386/234 |

FOREIGN PATENT DOCUMENTS

| | | |
|---|---|---|
| CN | 1607780 A | 4/2005 |
| CN | 1677975 A | 10/2005 |
| CN | 1929424 A | 3/2007 |
| CN | 1960474 A | 5/2007 |
| CN | 101021774 A | 8/2007 |
| CN | 101044718 A | 9/2007 |
| CN | 101075820 A | 11/2007 |
| CN | 101094140 A | 12/2007 |
| CN | 101137960 A | 3/2008 |
| CN | 101147308 A | 3/2008 |
| CN | 101179359 A | 5/2008 |
| CN | 101288063 A | 10/2008 |
| CN | 101657828 A | 2/2010 |
| CN | 1662920 B | 4/2010 |
| CN | 101841637 A | 9/2010 |
| CN | 101867623 A | 10/2010 |
| EP | 2256663 A | 12/2010 |
| GB | 2418809 A | 4/2006 |
| JP | 2001160927 A | 6/2001 |
| JP | 2005004089 A | 1/2005 |
| JP | 2005295286 A | 10/2005 |
| JP | 2005341094 A | 12/2005 |
| JP | 2006050216 A | 2/2006 |
| JP | 2007527156 A | 9/2007 |
| KR | 2008032979 A | 4/2008 |
| KR | 20100038089 A | 4/2010 |
| WO | 0147248 A | 6/2001 |
| WO | 0154342 A | 7/2001 |
| WO | 2004003801 A1 | 1/2004 |
| WO | 2008021855 A | 2/2008 |
| WO | 2008089854 A | 7/2008 |
| WO | 2008127507 A | 10/2008 |
| WO | 2009046869 A | 4/2009 |
| WO | 2010044599 A | 4/2010 |
| WO | 2010132296 A1 | 11/2010 |

OTHER PUBLICATIONS

Notice of Allowance mailed Jun. 27, 2014 in U.S. Appl. No. 12/970,159, 8 pages.

Office Action dated Jun. 5, 2014 in CN Pat. App. No. 201110417226.8, 14 pages, including partial translation and/or concise explanation of relevance.

Non-Final Office Action mailed Jul. 18, 2014 in U.S. Appl. No. 12/970,034, 24 pages.

Chinese Office Action mailed Jul. 11, 2014 in CN Patent App. No. 201110423031.4, 13 pages, including partial translation and/or concise explanation of relevance.

Araujo, Joao Taveira et al., "Towards Cost-Aware Multipath Routing," AIMS 2009, LNCS 5637, 2009, pp. 207-210.

(56) References Cited

OTHER PUBLICATIONS

Haas, Robert et al., "Cost-and Quality-of-Service-Aware Network-Service Deployment," 2001, 6 pages.
Lun, Desmond S. et al., "Network Coding with a Cost Criterion," MIT LIDS Technical Report P-2584, Apr. 2004, 18 pages.
Pawar, Pravin et al. "Towards Location based QoS-Aware Network Selection Mechanism for the Nomadic Mobile Services," Dec. 5, 2009, 5 pages.
Non-Final Office Action mailed Aug. 5, 2014 in U.S. Appl. No. 13/844,932, 7 pages.
Notice of Allowance mailed Jul. 24, 2014 in U.S. Appl. No. 12/972,230, 7 pages.
Notice of Allowance mailed Aug. 20, 2014 in U.S. Appl. No. 12/964,492, 13 pages.
Notice of Allowance mailed Sep. 3, 2014 in U.S. Appl. No. 12/970,159, 9 pages.
Notice of Allowance mailed Sep. 17, 2014 in U.S. Appl. No. 12/972,230, 7 pages.
Chinese Office Action mailed Aug. 5, 2014 in CN Patent App. No. 201110426179.3, 6 pages, including partial translation.
Non-Final Office Action mailed Sep. 29, 2014 in U.S. Appl. No. 12/748,829, 30 pages.
Non-Final Office Action mailed Oct. 2, 2014 in U.S. Appl. No. 14/318,380, 5 pages.
Chinese Office Action mailed Sep. 2, 2013 in CN Patent App. No. 201110408217.2, 6 pages, including partial translation.
Chinese Office Action mailed Sep. 4, 2014 in CN Patent App. No. 201110423001.3, 6 pages, including partial translation.
Chinese Office Action mailed Sep. 2, 2014 in CN Patent App. No. 201110408217.2, 6 pages, including partial translation.
Final Office Action mailed Oct. 6, 2014 in U.S. Appl. No. 12/972,104, 10 pages.
Chinese Office Action mailed Sep. 9, 2014 in CN Patent App. No. 201110400433.2, 13 pages including partial translation.
Non-Final Office Action mailed Oct. 27, 2014 in U.S. Appl. No. 13/772,275, 14 pages.
"Office Action and Search Report Issued in Chinese Patent Application No. 201110400472.2", Mailed Date: Oct. 27, 2014, 14 Pages.
Notice of Allowance mailed Nov. 12, 2014 in U.S. Appl. No. 13/844,932, 8 pages.
Final Office Action mailed Dec. 14, 2014 in U.S. Appl. No. 12/960,730, 22 pages.
Final Office Action mailed Dec. 5, 2014 in U.S. Appl. No. 12/970,069, 21 pages.
Office Action dated Dec. 15, 2014 in CN Pat. App. No. 201110417153.2, 8 pages, including partial translation.
Final Office Action mailed Jan. 9, 2015 in U.S. Appl. No. 14/318,380, 8 pages.
Final Office Action mailed Jan. 16, 2015 in U.S. Appl. No. 12/960,753, 12 pages.
Final Office Action mailed Jan. 28, 2015 in U.S. Appl. No. 12/970,034, 24 pages.
Chinese Office Action mailed Jan. 7, 2015 in CN Patent App. No. 201110400433.2, 10 pages including partial translation.
Office Action dated Feb. 3, 2015 in CN Pat. App. No. 201110417226.8, 7 pages, including partial translation and/or concise explanation of relevance.
Notice of Allowance mailed Mar. 20, 2015 in U.S. Appl. No. 12/970,069, 11 pages.
Choi, Jongmyung., "RFID Context-aware Systems", In Proceedings of Sustainable Radio Frequency Identification Solutions, Feb. 1, 2010, pp. 307-331.
Currie, et al., "Experimental Evaluation of Read Performance for RFID-based Mobile Sensor Data Gathering Applications", In Proceedings of the 7th International Conference on Mobile and Ubiquitous Multimedia, Dec. 3, 2008, pp. 92-95.
Kaasinen, et al., "Ambient Functionality—Use Cases", In Proceedings of the 2005 joint conference on Smart objects and ambient intelligence: innovative context-aware services: usages and technologies, Oct. 12, 2005, 6 pages.
Kitson, Fred., "Mobile Media Making it a Reality", In Proceedings of Mobile Computing, vol. 3, Issue 4, Jun. 7, 2005, 17 pages.
Klym, et al., "The Evolution of RFID Networks: The Potential for Disruptive Innovation", In White Paper, Mar. 2006, 20 pages.
Roduner, et al., "Operating Appliances with Mobile Phones—Strengths and Limits of a Universal Interaction Device", In Proceedings of the 5th international conference on Pervasive computing, May 13, 2007, 18 pages.
Non-Final Office Action mailed Mar. 31, 2015 in U.S. Appl. No. 14/318,380, 7 pages.
Non-Final Office Action mailed Apr. 23, 2015 in U.S. Appl. No. 14/458,203, 10 pages.
Office Action dated Apr. 13, 2015 in CN Pat. App. No. 201110400472.04, 14 pages, including partial translation and/or concise explanation of relevance.
Hassan, Amer; "Secure Protocol for Peer-To-Peer Network"; U.S. Appl. No. 14/600,477, filed Jan. 20, 2015; 62 pages including Preliminary Amendment filed May 8, 2014.
Non-Final Office Action mailed Jun. 10, 2015 in U.S. Appl. No. 12/972,104, 10 pages.
Notice of Allowance mailed Jun. 8, 2015 in U.S. Appl. No. 13/772,275, 8 pages.
Notice of Allowance mailed Jun. 24, 2015 in U.S. Appl. No. 14/458,203, 11 pages.
Non-Final Office Action mailed Jun. 30, 2015 in U.S. Appl. No. 12/970,034, 26 pages.
Final Office Action mailed Jul. 13, 2015 in U.S. Appl. No. 14/318,380, 8 pages.
Extended European Search Report dated Jun. 8, 2015 in EP Patent App. No. 11849551.4, 6 pages.
Chinese Office Action mailed Jul. 13, 2015 in CN Patent App. No. 201110400433.2, 3 pages.
"Office Action Received in Australia Patent Application No. 2011343700", Mailed Date: Jul. 24, 2015, 2 Pages.
Non-Final Office Action mailed Aug. 4, 2015 in U.S. Appl. No. 12/960,753, 16 pages.
Office Action dated Aug. 14, 2015 in CN Pat. App. No. 201110417226.8, 6 pages, including partial translation.
Non-Final Office Action mailed Sep. 4, 2015 in U.S. Appl. No. 14/318,380, 6 pages.
Notice of Allowance mailed Oct. 8, 2015 in U.S. Appl. No. 12/970,069, 9 pages.
"International Search Report", Mailed Date: Aug. 14, 2012, Application No. PCT/US2011/065276, Filed Date: Dec. 15, 2011, pp. 9.
"International Search Report", Mailed Date: Jul. 12, 2012, Application No. PCT/US2011/063207, Filing Date: Dec. 4, 2011, pp. 9.
"International Search Report", Mailed Date: Jun. 22, 2012, Application No. PCT/US2011/063340, Filed Date: Dec. 5, 2011, pp. 9.
"Omnidrive", 2006, retrieved Oct. 26, 2006, 2 pages.
"Xdrive", 2006, retrieved Oct. 26, 2006, 2 pages.
"Second Office Action Issued in Chinese Patent Application No. 201110408217.2", Mailed Date: May 23, 2014, Filed Date: Dec. 9, 2011, 8 pages including partial translation.
02 Network Scraps Unlimited Data for Smartphones; Published Date: Jun. 10, 2010; 2 pages.
802.11 Fast BSS Transition (FT) Part 1 of 2; Published Date: Aug. 21, 2007, 5 pages.
A New Location Technique for the Active Office—Published Date: 1997, http://citeseerx.ist.nsu.edu/viewdoc/download? doi=10.1.1.20.5052&rep=repl&type=pdf.
Advisory Action mailed Jan. 2, 2013 in U.S. Appl. No. 11/726,862, 3 pages.
Butler, Kevin R.B. et al.; Leveraging Identity-Based Cryptography for Node ID Assignment in Structured P2P Systems; IEEE Transactions on Parallel and Distributed Systems; vol. 20, No. 12; Dec. 2009; pp. 1803-1815.
Chinese Office Action dispatched Dec. 4, 2013 in CN Patent Application No. 201110426187.8 , 8 pages including Concise Explanation of Relevance and/or partial translation.
Chinese Office Action dispatched Feb. 28, 2014 in CN Patent Application No. 201110426179.3, 9 pages including Concise Explanation of Relevance and/or partial translation.

(56) References Cited

OTHER PUBLICATIONS

Chinese Office Action mailed Jan. 6, 2014 in CN Patent App. No. 201110423068.7, 8 pages including concise explanation of relevance and partial translation.
Chinese Office Action mailed Nov. 20, 2013 in CN Patent App. No. 201110423001.3, 18 pages including translation.
Chinese Office Action mailed Dec. 4, 2013 in CN Patent App. No. 201110408217.2, 12 pages, including Concise Explanation of Relevance and/or partial translation.
Chinese Office Action mailed Dec. 4, 2013 in CN Patent App. No. 201110423031.4, 26 pages including translation.
Chinese Office Action mailed Feb. 17, 2014 in CN Patent App. No. 201110400433.2, 12 pages including partial translation.
Chinese Office Action mailed Feb. 27, 2014 in CN Patent App. No. 201110400472.2, 13 pages including Concise Explanation of Relevance and partial translation.
Cisco Systems, Inc., "802.11 n. Wireless Technology Overview," 2007, 7 pages.
Creating Customized Web Experiences with Windows Media Player 9 Series; Published Date: Nov. 2002; 1 page.
CRTDH; An Efficient Key Agreement Scheme for Secure Group Communications in Wireless Ad Hoc Networks; Published Date: 2005, 5 pages.
Extended European Search Report dated May 20, 2014 in EP Patent App. No. 11847426.1, 8 pages.
Final Office Action mailed Oct. 25, 2013 in U.S. Appl. No. 12/972,104, 10 pages.
Final Office Action mailed Nov. 13, 2012 in U.S. Appl. No. 12/748,829, 42 pages.
Final Office Action mailed Nov. 15, 2010 in U.S. Appl. No. 11/726,862, 21 pages.
Final Office Action mailed Dec. 26, 2013 in U.S. Appl. No. 12/967,638, 34 pages.
Final Office Action mailed Feb. 11, 2014 in U.S. Appl. No. 12/970,069, 26 pages.
Final Office Action mailed Feb. 15, 2013 in U.S. Appl. No. 12/967,761, 28 pages.
Final Office Action mailed Feb. 15, 2013 in U.S. Appl. No. 12/970,069, 23 pages.
Final Office Action mailed Mar. 28, 2013 in U.S. Appl. No. 12/967,638, 22 pages.
Final Office Action mailed Sep. 15, 2011 in U.S. Appl. No. 11/726,862, 24 pages.
Final Office Action mailed Sep. 20, 2012 in U.S. Appl. No. 11/726,862, 35 pages.
Final Office Action mailed Sep. 23, 2013 in U.S. Appl. No. 12/970,034, 22 pages.
Guide to IEEE 802.11i: Establishing Robust Security Networks;Published Date: Jun. 2006; 155 pages.
How Do You Use as a TV Remote Control?; Published Date: Jul. 15, 2008; 6 pages.
International Search Report mailed Jul. 24, 2012 in PCT Application No. PCT/US2011/065691, Date Dec. 17, 2011, 11 pages.
International Search Report mailed Sep. 5, 2012 in PCT Application No. PCT/US2011/065692, Filing Date: Dec. 17, 2011, 8 pages.
International Search Report; Mailed Date: Aug. 31, 2012; Application No. PCT/US2011/064753; Filed Date: Dec. 14, 2011, pp. 8.
International Search Report; Mailed Date: Jul. 31, 2012; Application No. PCT/US2011/065285; Filed Date: Dec. 15, 2011, pp. 9.
Manage Subscription Products & Automate Recurring Billing Operations; Copyright 2008-2009; Retrieved Date: Jan. 12, 2010, 1 page.
Manifest Permission; Published Date: Jul. 21, 2004; 19 pages.
Meinrath et al.; "Unlicensed 'White Space Device' Operations on the TV Band and the Myth of Harmful Interferences", Mar. 2008, 13 pages.
Meinrath et al.; "White Space Devices & the Myths of Harmful Interference", 11 N.Y.U.J. Legis&Pub. Policy 495, 2008, 24 pages.
Menezes, Pascal; "Operating System Supporting Cost Aware Applications"; U.S. Appl. No. 13/844,932, filed Mar. 16, 2013; 57 pages.
MIST: Cellular Data Network Measurement for Mobile Applications; Published Date: Apr. 24, 2006; 9 pages.
Mobile Internet Usage Measurements—Case Finland; Published Date: Apr. 24, 2006; 140 pages.
Mohammed, "Web Service for User and Subscription Data Storage", U.S. Appl. No. 13/772,275, filed Feb. 20, 2013, 49 pages.
Motorola, "TV White Space Position Paper," 2008, 10 pages.
Non-Final Office Action mailed Jan. 4, 2013 in U.S. Appl. No. 12/960,730, 14 pages.
Non-Final Office Action mailed Oct. 2, 2012 in U.S. Appl. No. 12/967,638, 33 pages.
Non-Final Office Action mailed Oct. 16, 2012 in U.S. Appl. No. 12/970,069, 23 pages.
Non-Final Office Action mailed Oct. 26, 2012 in U.S. Appl. No. 12/967,761, 24 pages.
Non-Final Office Action mailed Nov. 6, 2013 in U.S. Appl. No. 12/960,730, 16 pages.
Non-Final Office Action mailed Nov. 8, 2013 in U.S. Appl. No. 13/844,932, 6 pages.
Non-Final Office Action mailed Feb. 28, 2014 in U.S. Appl. No. 12/970,159, 22 pages.
Non-Final Office Action mailed Apr. 11, 2013 in U.S. Appl. No. 12/972,104, 15 pages.
Non-Final Office Action mailed Apr. 14, 2011 in U.S. Appl. No. 11/726,862, 22 pages.
Non-Final Office Action mailed Apr. 5, 2012 in U.S. Appl. No. 11/726,862, 23 pages.
Non-Final Office Action mailed May 23, 2014 in U.S. Appl. No. 12/748,829, 30 pages.
Non-Final Office Action mailed May 23, 2014 in U.S. Appl. No. 12/960,730, 18 pages.
Non-Final Office Action mailed May 30, 2013 in U.S. Appl. No. 12/970,034, 22 pages.
Non-Final Office Action mailed Jun. 18, 2014 in U.S. Appl. No. 12/960,753, 12 pages.
Non-Final Office Action mailed Jun. 20, 2014 in U.S. Appl. No. 12/972,104, 10 pages.
Non-Final Office Action mailed Jun. 23, 2010 in U.S. Appl. No. 11/726,862, 16 pages.
Non-Final Office Action mailed Jun. 9, 2014 in U.S. Appl. No. 12/970,069, 20 pages.
Non-Final Office Action mailed Aug. 14, 2013 in U.S. Appl. No. 12/967,638, 30 pages.
Non-Final Office Action mailed Aug. 16, 2013 in U.S. Appl. No. 12/970,069, 26 pages.
Non-Final Office Action mailed Aug. 9, 2012 in U.S. Appl. No. 12/748,829, 29 pages.
Non-Final Office Action mailed Sep. 24, 2012 in U.S. Appl. No. 12/964,492, 10 pages.
Non-Final Office Action mailed Sep. 6, 2012 in U.S. Appl. No. 12/972,230, 10 pages.
Notice of Allowance mailed Nov. 20, 2012 in U.S. Appl. No. 12/972,230, 9 pages.
Notice of Allowance mailed Dec. 26, 2013 in U.S. Appl. No. 12/972,230, 8 pages.
Notice of Allowance mailed Feb. 19, 2014 in U.S. Appl. No. 13/844,932, 8 pages.
Notice of Allowance mailed Mar. 10, 2014 in U.S. Appl. No. 12/972,230, 8 pages.
Notice of Allowance mailed Mar. 20, 2013 in U.S. Appl. No. 12/964,492, 9 pages.
Notice of Allowance mailed Mar. 25, 2013 in U.S. Appl. No. 12/972,230, 8 pages.
Notice of Allowance mailed Mar. 4, 2013 in U.S. Appl. No. 12/972,230, 7 pages.
Notice of Allowance mailed Mar. 6, 2014 in U.S. Appl. No. 12/967,638, 11 pages.
Notice of Allowance mailed Apr. 2, 2014 in U.S. Appl. No. 12/964,492, 9 pages.
Notice of Allowance mailed May 7, 2014 in U.S. Appl. No. 13/844,932, 7 pages.
Notice of Allowance mailed Jul. 12, 2013 in U.S. Appl. No. 12/967,761, 12 pages.

(56) References Cited

OTHER PUBLICATIONS

Office Action dated Apr. 1, 2014 in CN Pat. App. No. 201110423001.3, 8 pages, including partial translation.
Office Action dated Apr. 3, 2014 in CN Pat. App. No. 201110417153.2, 15 pages, including partial translation and/or concise explanation of relevance.
Shared Spectrum, Inc., "Our Technology," Nov. 2010, 2 pages.
Shih, Eugene et al.; Wake on Wireless: An Event Driven Energy Saving; Published Date: Sep. 23-26, 2002; 12 pages.
Sridhar, T.; Wi-Fi, Bluetooth and WiMAX; The Internet Protocol Journal, vol. 11, No. 4; Retrieved Date: Sep. 30, 2010, 9 pages.
Subscription Management; Copyright 2009; Retrieved Date: Jan. 12, 2010; 2 pages.
Symbian Foundation Peer-to-Peer WiFi Inititative (WiFi Direct); Published Date: Sep. 10, 2010, 11 pages.
Texas Instruments, MSP430 Ultra-Low-Power MCUs and TI-RFid Devices, 2 pages, 2009.
T-mobile "Unlimited" Data Usage; Published Date: Mar. 9, 2010; 6 pages.
Torres Service Management Platform; Retrieved Date: Jan. 12, 2010; 2 pages.
VAS Subscription Manager; Retrieved Date: Jan. 12, 2010; 1 page.
Wi-Fi Alliance: FAQs; Published Date: 2010; 19 pages.
Wi-Fi Certified Wi-Fi Direct, Personal, Portable Wi-Fi Technology; Oct. 2010, 14 pages.
WinLIRC; Published Date: Mar. 17, 2008; 5 pages.
Wireless PC to TV; Retrieved Date: Sep. 9, 2010; 2 pages.
Wood, "Kowari: A Platform for Semantic Web Storage and Analysis", May 27, 2005, 16 pages.
Yuan, Y. et al., "Allocating Dynamic Time-Spectrum Blocks in Cognitive Radio Networks," Sep. 9-14, 2007, 10 pages.
Hassan, Amer; "Cognitive Use of Multiple Regulatory Domains"; U.S. Appl. No. 14/458,203, filed Aug. 12, 2014; 58 pages including Preliminary Amendment filed Oct. 9, 2014.
Hassan, Amer; "Direct Connection With Side Channel Control"; U.S. Appl. No. 14/333,386, filed Jul. 16, 2014; 65 pages including Preliminary Amendment filed Sep. 26, 2014.
Notice of Acceptance dated Oct. 16, 2015 in AU Pat. App. No. 2011343943, 2 pages.
Office Action dated Aug. 13, 2015 in AU Pat. App. No. 2011343943, 5 pages.
Office Action dated Aug. 28, 2015 in JP Pat. App. No. 2013-544714, 5 pages including translation.
Notice of Allowance mailed Oct. 19, 2015 in U.S. Appl. No. 13/772,275, 8 pages.
Office Action dated Oct. 26, 2015 in JP Pat. App. No. 2013-543239, 13 pages including translation.
Notice of Allowance Issued in Chinese Patent Application No. 201110423031.4, Mailed Date: Jan. 23, 2015, 3 Pages.
Notice of Allowance Issued in U.S. Appl. No. 12/970,069 Mailed Date: Dec. 8, 2015, 3 Pages.
Notice of Allowance Issued in U.S. Appl. No. 12/970,069 Mailed Date: Nov. 12, 2015, 3 Pages.
Notice of Allowance Issued in U.S. Appl. No. 12/970,069, Mailed Date: Jan. 29, 2016, 4 Pages.
Notice of Allowance Issued in U.S. Appl. No. 12/970,069, Mailed Date: May 15, 2015, 4 Pages.
Menezes, Pascal; "Operating System Supporting Cost Aware Applications"; U.S. Appl. No. 15/098,321, filed Apr. 14, 2016; 57 pages.
Notice of Allowance dated May 24, 2016 in JP Pat. App. No. 2013-544714, 3 pages.
Final Office Action mailed Jun. 9, 2016 in U.S. Appl. No. 14/600,477, 9 pages.
Notice of Allowance mailed May 23, 2016 in U.S Appl. No. 14/863,290, 12 pages.
Non-Final Office Action mailed Jan. 21, 2016 in U.S. Appl. No. 14/863,290, 7 pages.
Final Office Action mailed Jan. 11, 2016 in U.S. Appl. No. 12/970,034, 25 pages.
Notice of Allowance mailed Jan. 7, 2016 in U.S. Appl. No. 14/318,380, 8 pages.
Non-Final Office Action mailed Aug. 18, 2016 in U.S. Appl. No. 12/972,104, 13 pages.

* cited by examiner

DIRECT CONNECTION WITH SIDE CHANNEL CONTROL

CROSS-REFERENCE TO RELATED APPLICATION

This application is a continuation of U.S. patent application Ser. No. 12/967,638 filed Dec. 14, 2010, entitled "DIRECT CONNECTION WITH SIDE CHANNEL CONTROL". The entirety of this afore-mentioned application is incorporated herein by reference.

BACKGROUND

Many computers today have radios to support wireless communication. Wireless communications are used, for example, to connect to access points. By associating with the access point, a wireless computer can access a network, such as the Internet, to which the access point is coupled. As a result, the wireless computer can access any device that is also connected to the network.

To enable computers to be configured for association with an access point, it is common for the access points to operate according to a standard. A common standard for devices that connect to access points is called Wi-Fi. There are multiple versions of this standard, but any of them can be used to support connections through access points.

Wireless communications may also be used to form connections directly to other devices without using an access point. These connections are sometimes called "peer-to-peer" connections and may be used, for example, to allow a computer to wirelessly connect to a mouse or keyboard. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. In fact, some computers have multiple radios to support such concurrent communication. More recently a standard has been proposed, called Wi-Fi Direct Access, that would enable both an infrastructure connection and communication as part of a peer-to-peer group. This standard, published by the Wi-Fi Alliance, extends the popular Wi-Fi communications standard for infrastructure-based communications to support direct connections.

Equipping computing devices to support direct connections is expected to expand the scenarios in which a wireless computing device can connect to other wireless devices. For example, computer users working together may more readily form a group that allows the users to share data. Similarly, a computer may more readily connect wirelessly to a printer or devices providing other desired services.

SUMMARY

An enhanced experience for a user of a wireless computing device is provided by equipping the computing device to, with minimal user interaction, use a remote audio-video presentation device as an output source for the computing device. For example, a computing device may use a wireless television as display to present the desktop of the computing device, a movie or other audio-video content available on the computing device.

To use the remote presentation device, the computing device may form two wireless connections with the remote presentation device. One connection may serve as an audio-video channel, supporting the streaming of audio-video content to the display device. A second channel may act as a side channel, transmitting commands to the remote presentation device that control the presentation of the audio-video content. The audio-video content may be generated by a component on the computing device, such as a media control application or a utility of the operating system. That component, or other suitable component, may receive user inputs and generate commands to control presentation of the audio-video content on the audio-video presentation device. These commands may control aspects of the audio-video device, such as the volume of the audio portion or the size and positioning of a video portion of the audio-video content.

Any suitable transports may be used to form these connections. In some embodiments, the audio-video channel may be implemented as a direct wireless connection using a protocol as is known in the art for peer-to-peer communication between a computing device a remote device. The connection for the side channel may be formed over the same or different transport. For example, the side channel may be formed as a wireless connection through an access point that establishes a local network to which both the computing device and remote display device are connected. Though, an infrared link or other transport providing near field communication may be used.

In some embodiments, the side channel may be formed using low power transmission in a licensed spectrum, such as the digital TV spectrum. The power of the transmissions may be low enough to avoid causing interference with receivers that may be in the vicinity of the computing device. Signal processing techniques may be used to enhance the effective signal level of signals in the side channel. For example, the signal may be transmitted at a low bit rate, with a low error control coding rate and/or with spread spectrum modulation.

In operation, the computing device and the remote presentation device may exchange communications that allow mutual identification of the same transport for the side channel and possibly values of other parameters used to set up the audio-video channel and side channel. This setup information may be stored such that, in response to user input, the appropriate connections can be quickly re-established.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
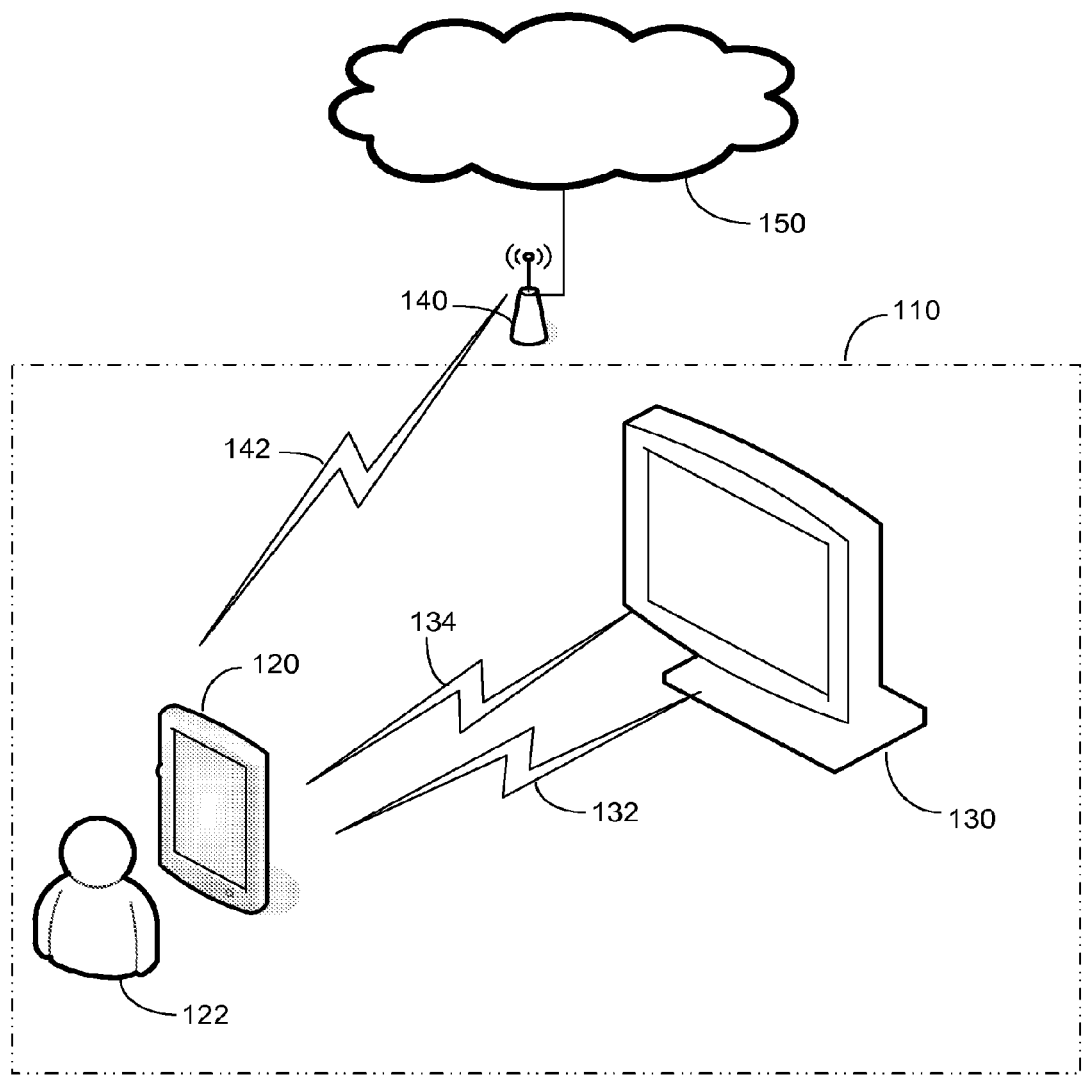
FIG. 1 is a sketch representing an exemplary environment in which embodiments of the invention may operate.

The inventors have recognized and appreciated that an enhanced user experience for a user of a wireless computing device may be provided by equipping the computing device to use available presentation devices for the presentation of audio-video content. To support such use, the computing device may be configured to form a first wireless link with an appropriate remote presentation device that can be used to carry data representing audio-video content. A second link may be used as a control channel to send presentation commands. Such commands may control aspects of the presentation of the audio-video content.

This audio-video content may be any suitable content and may be obtained from any suitable source. For example, the audio-video content may be audio only, representing music or a reading of a book. Alternatively, the audio-video content may be visual only, representing photographs, a presentation or images of a desktop of the computing device. Though, the audio-video content may be multi-media content, containing both audio and video components. For example, the content may represent a movie or a television program.

The computing device may be configured in any suitable way to obtain and provide a stream of data and commands relating to the presentation of the audio-video content. One or more other components may control the generation of a stream of data representing audio-video content. These components may also interface with the user to obtain inputs representing commands and generate data for transmission representing the commands. These components may be user mode components, such as a media control application. Though, the components may be within the operating system. A component in the operating system may be controlled to transmit to the remote presentation device content representing the desktop of the computing device, or some part of it, such as an active window, regardless of the application or applications that generated the content.

The computing device may contain components within the operating system that control one or more radios of the computing device to form links for the audio-video channel and the side channel. Any suitable transport or transports may be used to form the channel and side channel.

In some embodiments, a computing device and a presentation device may each support multiple transports. The devices may perform a discovery and negotiation process to select a mutually supported transport and ensure that the devices can communicate effectively. Though, in some embodiments, set up information may be stored for a pair of devices such that the devices can quickly establish an audio-video channel and a side channel.

In some embodiments, the audio-video channel may be formed using a Wi-Fi Direct Access peer-to-peer connection, or other suitable peer-to-peer connection. The side channel may be formed using Wi-Fi Direct access if the computing device supports such a connection. Though, other transports may be used for the side channel. For example, the side channel may be formed over a BLUETOOTH® link or a link in other suitable peer-to-peer protocol. Other embodiments may alternatively or additionally support communication over an IR link or other link using near field communication. The digital TV spectrum may also be used, with transmission limited to white spaces in the spectrum or done at such a lower power level that interference is avoided. Though, these are just examples of transports that may be used and any suitable transport may be used.

These capabilities may enhance the user experience by supporting many desirable user experiences. For example, a user may enter a room and show a movie on television in the room without any advance setup.

FIG. 1 illustrates an environment in which a computing device may be used to control presentation of audio-video information on a presentation device. In the example of FIG. 1, the computing device is represented as computing device 120, which in this example has a slate form factor. Computing device 120 is being operated by a user 122. Computing device 120 is configured to control the presentation of audio-video information through a presentation device, which in this example is represented by television 130.

Computing device 120 may be configured with an application that streams audio-video content data through a first channel, here represented as audio-video channel 132. An application on computing device 120 may additionally transmit commands to television 130 through a side channel 134. The audio-video content data may be a movie or other multi media content. Though, the specific audio-video content streamed to television 130 is not critical to the invention.

Command data transmitted over side channel 134 also may be in any suitable form. The command data, for example, may control the volume or other audio characteristic of the presentation of the audio-video content data. Alternatively or additionally, the commands transmitted through side channel 134 may control one or more visual characteristics of the presentation of the audio-video data, such as the brightness of the display on TV 130. Though, it should be appreciated that the specific commands transmitted through side channel 134 may depend on the types of commands that television 130 is configured to process. For example, if television 130 is configured to respond to a command that freezes the display, such a command may be transmitted in side channel 134.

The specific frequencies used for audio-video channel 132 and side channel 134 are not critical to the invention. Similarly, the protocols and other parameters of communication in the audio-video channel 132 and side channel 134 are not critical to the invention. Though, in some embodiments, the side channel 134 may be formed over a different frequency spectrum and may use a different protocol and other transmission parameters than audio-video channel 132. As a specific example, audio-video channel 132 may be a channel formed in the industrial, scientific and medical (ISM) radio band or in the unlicensed national information infrastructure (UNIT) band.

As a specific example, audio-video channel 132 may transmit over frequencies specified in a Wi-Fi standard. In this example, computing device 120 may form a direct connection, using the Wi-Fi direct protocol. In such a scenario, computing device 120 may be configured as a group owner in accordance with the Wi-Fi direct standard and television 130 may be equipped with a wireless receiver and associated controller that forms a Wi-Fi direct group as a client of computing device 120. Such a controller within television 130 may then receive audio-video content over audio-video channel 132 and pass that data to the components within television 130 that present the audio-video content on a screen of the television and through speakers coupled to television 130.

As an example of a suitable frequency spectrum and suitable protocol for side channel 134, if computing device 120 is equipped with an infrared transmitter, side channel 134 may be formed using infrared frequencies. In such a scenario, television 130 may be equipped with an IR receiver, such as is known in the art for receiving signals from remote control devices. In such a scenario, communications over side channel 134 may be formatted using protocols as are known in the art for remote control devices for televisions.

Though, it should be appreciated that other frequencies and other protocols may alternatively or additionally be employed. For example, many computing devices are equipped with a BLUETOOTH® radio. If television 130 is similarly equipped with a BLUETOOTH® radio, side channel 134 may be formed as a BLUETOOTH® peer-to-peer connection. As a further example of a possible alternative, low power communications may be used to form the side channel. As illustrated in FIG. 1, control of television 130 may be performed while computing device 120 is in the same room 110 as television 130. Accordingly, the distance between computing device 120 and television 130 may be relatively small. The data rate of communications between computing device 120 and television 130 for commands may be relatively low, such as 56K bits per second or less. In some embodiments, the data rate may be 32K bits per second or less. Consequently, error control coding with a very low coding rate may be used such that very low power may be used for transmission in side channel 134. As a result, even low power transmission techniques, such as proximity technologies including NFC, Transfer Jet and Felica may be used.

Moreover, frequency spectra used for purposes other than peer-to-peer communication, because the requirement for transmit power may be relatively low, may also be used without creating unacceptable interference for other devices using those frequencies. As a specific example, side channel 134 may be formed in the digital TV spectrum. Such transmission may be made at low power to avoid causing interference.

Though, it is not a requirement that very low power transmissions be used for forming side channel 134. As an alternative, side channel 134 may be formed using the same frequency spectrum used to form audio-video channel 132. In the example of FIG. 1 in which audio-video channel 132 is formed in a spectrum ranging from approximately 2.4 GHz to 5 GHz, side channel 134 may be similarly based on transmissions in that frequency range.

Given the range of possible transports for forming side channel 134, in some embodiments, computing device 120 and/or television 130 may support multiple transports that may be used to form side channel 134. In such a scenario, computing device 120 and television 130 may exchange communications to negotiate a specific transport, such as a frequency and/or protocol for forming side channel 134. In the embodiment in which audio-video channel 132 is formed using a peer-to-peer protocol that involves a pairing ceremony, parameters defining side channel 134 may be negotiated as part of that pairing ceremony.

Though, regardless of the specific mechanism by which audio-video channel 132 and side channel 134 are formed, once formed, user 122 may control both the content and presentation parameters of television 130 through a user interface on computing device 120. The specific audio-video content streamed from computing device 120 may therefore be selected by user 122 interacting with computing device 120. The specific audio-video content selected and the source of that content is not critical to the invention. However, FIG. 1 illustrates that computing device 120 may also be connected through access point 140 to a broader network, such as the Internet 150. In this example, the connection between computing device 120 and Internet 150 is a wireless connection 142. Wireless connection 142 may be formed with the same or different radio within computing device 120 that is used to form audio-video channel 132 and/or side channel 134. Connection 142, for example, may be in accordance with a Wi-Fi infrastructure mode protocol while audio-video channel 132 may be formed using a Wi-Fi Direct Access protocol.

Regardless of how connection 142 is formed, user 122 may use connection 142 to access audio-video content available over the Internet 150. Though any other suitable technique for obtaining audio-video content may alternatively or additionally be used, and it should be appreciated that connection 142 is illustrated only as an example of audio-video content that may be obtained by computing device 120 and streamed through audio-video channel 132 for presentation on a device, such as television 130.

Figure 2:
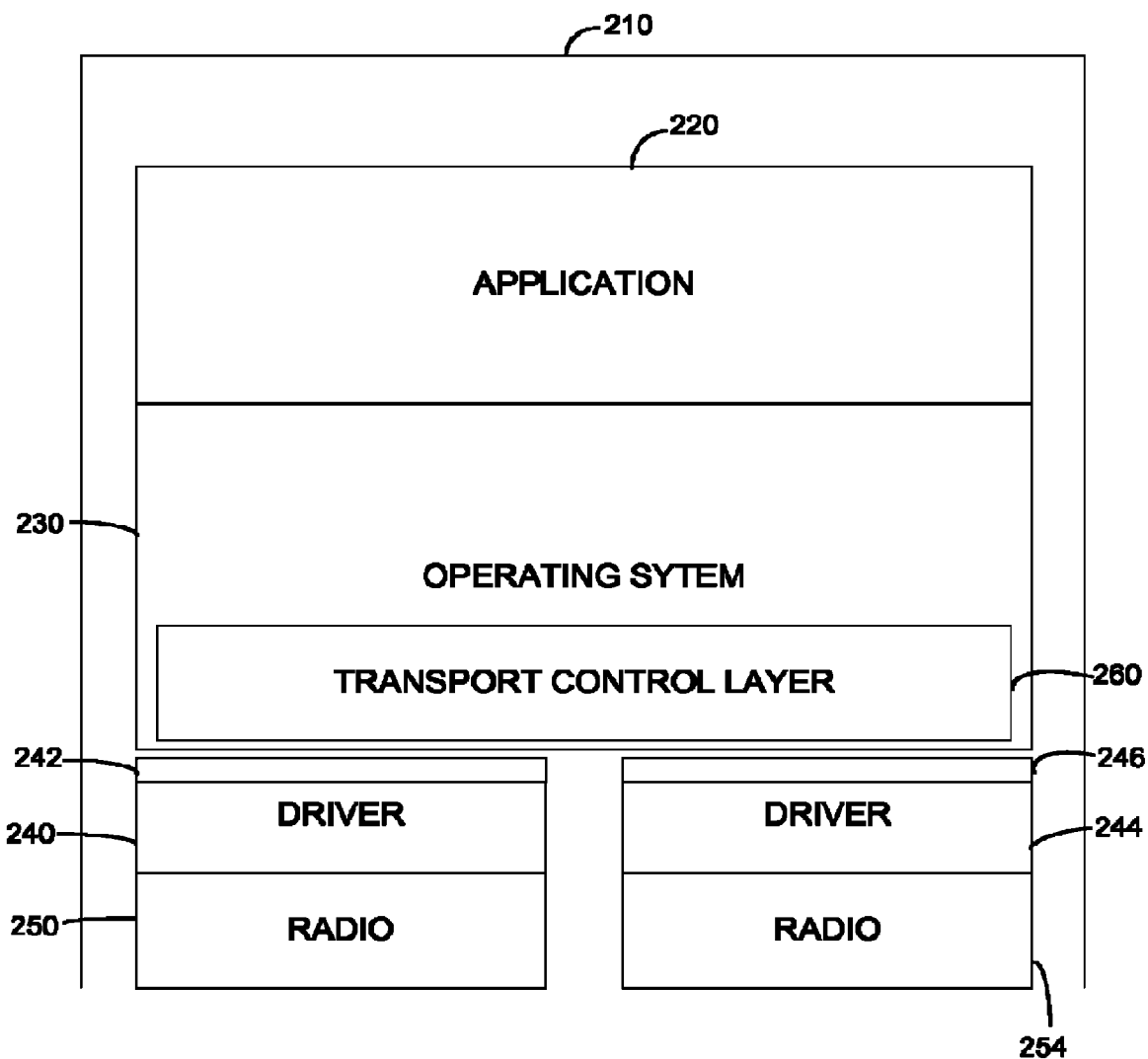
FIG. 2 is a simplified block diagram of a computing device according to some exemplary embodiments of the invention.

Computing device 120 may have any suitable architecture to support functions such as obtaining audio-video content, receiving user input to control the presentation of that content on a device and interacting with the presentation device to cause the audio-video content to be presented with the appropriate format. FIG. 2 provides an example of such an architecture.

FIG. 2 illustrates, at a high level, an architecture for computing device 210 that may be operated to transmit information in at least two channels—one for transmitting audio-video content and one for transmitting commands. In the example of FIG. 2, computing device 210 includes two radios, radio 250 and radio 254. Each of the radios may be adapted to send and receive wireless communications. Radio 250, for example, may be used for wireless communication over a first channel and may be adapted for transmission of audio-video content. Radio 254, for example, may be used for wireless communication over a second channel and may be adapted for transmission of commands. Though, it should be appreciated that, in some embodiments a single radio may be used to support concurrent communication in multiple channels.

In the example of FIG. 2, an application 220 is illustrated. Application 220 may generate information for wireless transmission or may process information received wirelessly. In the embodiment illustrated, that information may be an audio-video stream, which may contain information representing audio content and/or video content, and possible other information, such as control information. As a specific example, application 220 may be a media control application, configuring computing device 210 to provide a user interface through which a user may select audio-video content to be streamed to a display device, such as a television or stereo. Media Control applications are known. For example, many computers are configured with the WINDOWS® MEDIA CENTER® application. Techniques similar to those used to create such applications may be used to create application 220. Though, in addition to presenting content on a display associated directly with computing device 210, application 220 may be programmed to present such information on a remote device through transmission over channels such as channels 132 and 134.

Though the architecture of the remote presentation device is not shown, a device receiving and presenting an audio-video stream may have a similar architecture. In such an embodiment, application 220, may not receive user inputs directly. However, it may be computer-executable components that receive and render the audio-video stream on a display and respond to user commends received over channels 132 and 134.

In the example of FIG. 2, application 220 interfaces with operating system 230. In some embodiments, operating system 230 may be a general purpose operating system, such as the WINDOWS® operating system. Such a configuration may be desirable when computing device 210 executes applications other than application 220. Though, in embodiments in which computing device 210 is configured specifically for presentation of audio-video information, operating system 230 may have more limited functionality.

Regardless of whether operating system 230 is a special purpose or general purpose operating system, in the embodiment illustrated, a function of operating system 230 is to provide services that facilitate wireless transmission and reception of information processed by application 220. For transmission, operating system 230 may receive a request from application 220 to establish a connection with a nearby device. Thereafter, operating system 230 may receive from application 220 a stream of information representing audio-video content to be transmitted over that connection. Operating system 230 may then cause that data to be transmitted. In this example, transmission is by radio 250, thereby implementing a data channel such as channel 132.

In embodiments in which computing device 210 is receiving and presenting audio-video information from another device, operating system 230 may respond to a request, received wirelessly, from another device to establish a connection. Operating system 230 may then provide data received over that connection to application 220 for processing, which may include presentation of the data in an audible and/or visual format.

Such a connection may be formed using techniques as are known in the art. In the illustrated example, that connection may be a direct, device-to-device connection. As a specific example, that connection may be formed using frequencies and a protocol specified as Wi-Fi Direct. Operating system 230 may then make that connection available to application 220 by presenting a network adapter, or other suitable interface through which application 220 may access the connection. Though any suitable technique may be used.

Application 220 also may receive user input representing commands to control the external device. For example, those commands may represent commands to change the volume with which audio information is presented or to change visual characteristics of a display, such as brightness. Though, it should be appreciated that these specific commands are illustrative and not limiting such that any suitable commands may be supported.

Operating system 230 may receive these commands from application 220 and route them for transmission. In this example, the commands may be routed for transmission through radio 254. Such transmission may be over a connection formed by operating system 230 to implement a side channel, such as a side channel 134. Access to the side channel also may be made through a network adapter created by the operating system 230. Through the use of network adapters, operating system 230 can provide a mechanism for application 220 to request transmission of audio-video content and commands in a way that does not depend on the specific transport used to create the channels. In this way, application 220 may function without regard to the specific transports to be dynamically selected.

To support processing of communications for transmission over different transports, a transport control layer 260 may be included within operating system 230. Transport control layer 260 may process multiple requests from application 220 for transmission of data and route that data as appropriate for transmission. Data representing an audio-video stream, for example, may be formatted for transmission through radio 250. Data representing a command may be formatted for transmission through radio 254.

Additional transport specific processing may be performed within transport control layer 260. For example, in some embodiments, commands will be transmitted over a low power side channel. Such information may be transmitted with a relatively low bit rate and/or with a relatively large amount of error control coding. Transport control layer 260 may appropriately process the commands for transmission and/or control radio 254 to transmit that data with the desired power level or error control coding, which may not similarly occur if another transport is used.

The specific processing performed within transport control layer 260 may depend on the specific transport used to implement the first channel to carry audio-video data and the specific transport used to carry commands. For example, a wireless link established in either a UNII or ISM domain may be used as a transport for audio-video data and that transmission may be in accordance with a known protocol for computer to device communication. In such an embodiment, conventional processing for audio-video data may be used in transport control layer 260.

Different processing may be used for commands. The commands may be sent using a transport such as IR or BLUETOOTH®. In such embodiments, conventional processing may be used to format the command data for transmission, though that processing may be different than the processing performed on the audio-video content data.

Alternatively, a wireless link established in a licensed domain, such as Digital TV may be used as a transport for command data. When such a transport is used, processing within transport control layer 260 may entail setting appropriate gain, modulation, error control encoding or other parameters of radio 254. Though, it should be appreciated that, instead of setting parameters of a radio to perform desired processing, transport control layer 260 may directly perform some or all of the processing. For example, error control encoding and possibly other functions may be performed by software components executing on a processor core in computing device 210. Accordingly, it should be appreciated that, though FIG. 2 may suggest a specific architecture, that architecture is exemplary and not limiting.

Transport control layer 260 may also respond to received information. That received information may request a connection requested by another device. Received information may also represent data for presentation or other types of information.

To send and receive data, transport control layer 260 may interact with one or more radios, of which radios 250 and 254 are illustrated. Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. These commands may include commands to configure radio 250 for transmission at certain frequencies or to use certain modulation schemes or error control coding for symbols to be transmitted. Additionally, through interface 242, driver 240 may receive data for transmission by radio 250. Accordingly, interface 242 provides a mechanism through which transport control layer 260 may control radio 250 to transmit data representing a stream of audio-video data. Radio 250 may also use interface 242 to provide data and status message to operating system 230.

Regardless of the specific commands, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

In the embodiment illustrated in FIG. 2, computing device 210 includes a second radio 254. While radio 250 may be used, for example, for transmitting and/or receiving a stream of data representing audio-video content, radio 254 may be used for transmission and/or reception of data representing commands to control a remote audio-video device.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide data and status messages to operating system 230. Interface 246, like interface 244, may be a standardized interface such that operating system 230 may communicate with driver 244 using a similar set of commands as are used to driver 240.

Though two radios are shown, it should be appreciated that any suitable number of radios may be included within computing device 210. For example, a separate radio may be used to form audio-video channel 132, side channel 134 and connection 142 (FIG. 1). Though, in embodiments in which those channels are formed using similar frequencies, a single radio may be used to form all of the indicated connections. Accordingly, the specific hardware configuration of computing device 210 is not critical to the invention.

Regardless of the specific construction of computing device 210, computing device 210 may be configured with software to present a user interface through which a user may be select audio-video content for presentation on a nearby presentation device and also control parameters of that presentation.

Figure 3:
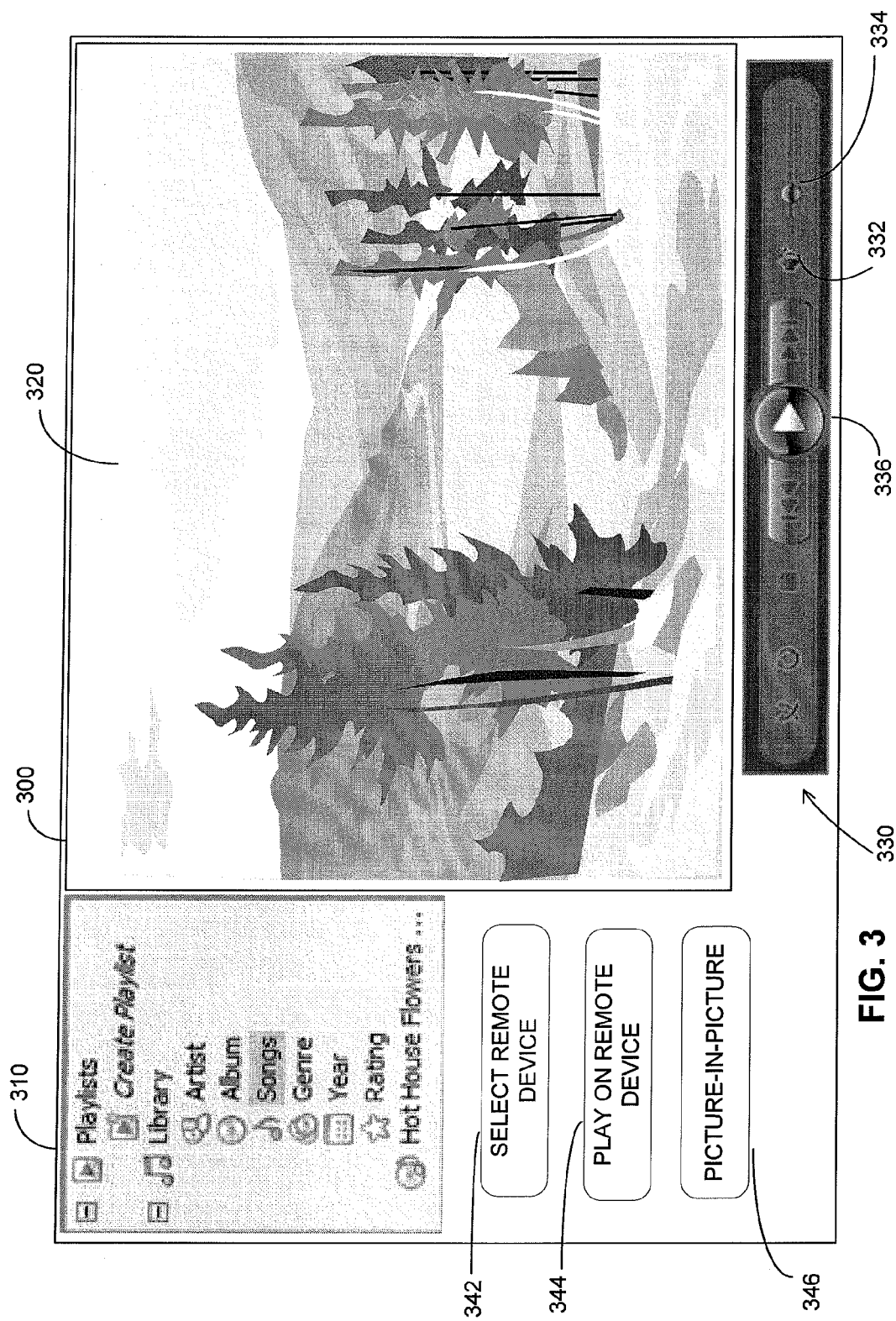
FIG. 3 is a sketch of a graphical user interface provided by an application executing on the computing device of FIG. 2.

FIG. 3 illustrates a user interface that may be presented by such software. User interface 300 may be presented on a screen of computing device 210 by any suitable components within computing device 210. Though, in the embodiment illustrated, application 220 (FIG. 2) may be a media control application, which may present user interface 300. In this example, the media control application may control the presentation of audio-video content of any suitable form. The audio-video content, for example, may be audio only, video only or may be multi-media, involving both an audible and visual component. In this example, user interface 300 is configured for controlling the presentation of audio-video content that has both an audio component and a video component.

A user may interact with application 220 through graphical user interface 300 using interface techniques as are known in the art. For example, user interface 300 may include controls that a user may activate using a mouse or other human interface device. Upon activation of a control by a user, application 220 may be prompted to execute a function associated with the control. For example, user interface 300 includes media selection controls 310. Such controls may perform functions as are known in the art for media control applications. By activation of one or more of the media selection controls 310, a user may navigate through media files on or accessible to computing device 210 to identify a file representing audio-video content for presentation.

In the operating state illustrated in FIG. 3, a user has activated a media selection control to select a movie. The selected content may be presented through content display area 320. Accordingly, in the operating state illustrated by FIG. 3, a movie, representing selected audio-video content, is being presented in media display area 320.

A media control application may also provide media playback controls 330. Those controls, for example, may include a play control 336. Activation of play control 336 may cause selected audio-video content to play in content display area 320. Play control 336 may toggle between states such that when the selected audio-video content is being played in content display area 320, user activation of play control 336 may freeze the playing of the audio-video content.

As another example of a media playback control, application 220 may present a control 332 that mutes the sound such that an audio portion of the audio-video content may be suppressed. Alternatively or additionally, media playback controls 330 may include a slider 334. Slider 334 may be a control as is known in the art that allows a user to specify a value from a range of values. The specified value may correlate with a volume of the audio portion of audio-video content being presented in content display area 320.

Aspects of user interface 300 may be implemented as in a conventional media control application. For example, media selection controls 310, content display area 320 and media playback controls 330 may be implemented using techniques as are known in the art.

Though, a media control application may be adapted such that the behavior of some or all of these components changes when computing device 210 is being used to control the presentation of audio-video content on a remote presentation device. For example, when operating in a remote control mode, selection of play control 336 may trigger the streaming of data representing audio-video content over an audio-video channel, such as channel 132 (FIG. 1). Similarly, when operating in a remote control mode, selection of mute control 332, instead of or in addition to controlling the sound level at computing device 210, may trigger transmission of a command over a side channel, such as side channel 134 (FIG. 1), commanding the presentation device to mute the sound. Similarly, in remote control mode, activation of slider 334 may result in a command, representing a change in volume command, being transmitted over the side channel.

Alternatively or additionally, a media control application may be modified to present commands that control functions specifically related to remote control of a presentation device. The example of FIG. 3 illustrates a device control 342, a presentation control 344 and a picture-in-picture control 346. These controls are examples of controls that may be specifically supported to allow computing device 210 to operate as a remote control. Other controls may alternatively or additionally be provided.

In some embodiments, the specific controls made available through user interface 300 in a remote control mode may depend on capabilities of the remote presentation device. Such capabilities, for example, may be communicated to computing device in any suitable way. For example, information defining capabilities of the remote control device may be obtained when a connection for audio-video channel 132 is created. Alternatively, the information may be communicated over side channel 134. Accordingly, a media control application may select controls for presentation based on information about a remote presentation device with which it is compared.

In the example of FIG. 3, device control 342 may be activated by a user before the media control application is operating in remote control mode. Activation of device control 342 may cause the media control application to present a further user interface through which a user may select a nearby device to act as a presentation device. As a specific example, activation of device control 342 may cause a user interface as depicted in FIG. 4 to be presented to the user.

Figure 4:
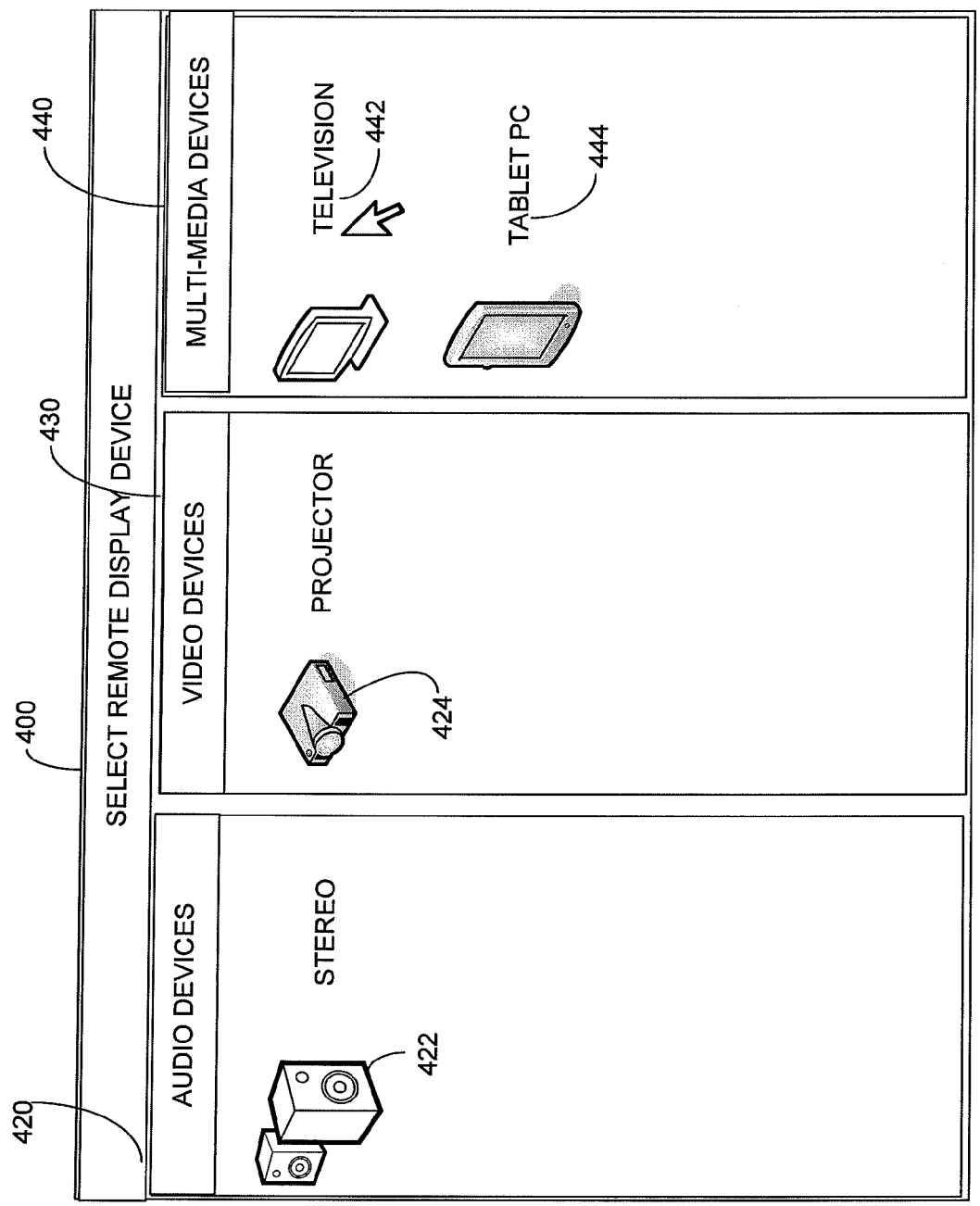
FIG. 4 is a sketch of a further graphical user interface that may be presented by the computing device of FIG. 2.

FIG. 4 illustrates a graphical user interface 400 through which a user may select a remote device to act as a presentation device for audio-video content. Graphical user interface 400 may be presented in any suitable way. For example, application 220 may be programmed to present graphical user interface 400. Though, in other embodiments, graphical user interface 400 may be presented by a component of operating system 230. For example, in other contexts it is known for an operating system 230 to contain a device manager that can discover and present to a user a list of options for nearby devices with which a wireless connection may be formed. In some embodiments, graphical user interface 400 may be presented by such a device manager or other suitable component of operating system 230.

Application 220 may obtain information about nearby devices that can operate as presentation devices in any suitable way. For example, in the embodiment illustrated in FIG. 1 in which audio-video channel 132 is to be implemented using a peer-to-peer protocol, such as Wi-Fi direct, media control application 220 may control operating system 230 to transmit messages in accordance with device discovery or service discovery aspects of that protocol. In accordance with the device discovery aspects of a peer-to-peer protocol, nearby devices may respond to a device discovery message in a way that reveals their capabilities for presenting audio-video content.

Graphical user interface 400 illustrates an operating state in which multiple presentation devices have been discovered. Those presentation devices are presented through graphical user interface 400 in a way that reveals their capabilities for presentation of audio-video content. In this example, a display area 420 is provided for devices that can present audio content only. A display area 430 is provided for devices that can present video content only. A further display area 440 is presented for devices that can present multimedia content. In the specific example of FIG. 4, display area 420 includes an icon 422, indicating that a stereo, capable of presenting audio information, has been detected. Display area 430 includes an icon 424, indicating that a projector, capable of presenting video content, has been detected. Display area 440 contains two icons, icon 442 indicating that a television has been detected and icon 444 indicates that a tablet PC has been detected. Though a tablet PC may not conventionally be regarded as an audio-video presentation device, a tablet PC includes a visual display and speakers for presentation of audio, in some embodiments, the tablet PC may be controlled for presentation of multimedia content.

It should be recognized that the specific devices presented through graphical user interface 400 may depend on the devices in the vicinity of computing device 210. Regardless of the specific devices discovered and presented through user interface 400, a user may manipulate a mouse or other human interface device to select one of the discovered devices. Selecting a device may cause the media control application or other suitable component of computing device 210 to interact with the selected device to form an audio-video channel and a side channel over which both audio-video content and commands, respectively, may be communicated.

Returning to FIG. 3, once an audio-video channel and a side channel are formed with a device, a user may provide further input through user interface 300 to indicate that selected multimedia content is to be streamed to the selected presentation device. Presentation control 344 may be provided for this purpose. Upon selection of presentation control 344, media control application 220 may respond by requesting operating system 230 transmit over the audio-video channel data representing audio-video content that appears in content display area 320. Selection of presentation control 344 may cause that audio-video content to be streamed over the audio-video channel instead of or in addition to being presented in content display area 320.

In some embodiments, presentation control 344 may be a toggle-type control. Such a control may cause different affects in different operating states. For example, when audio-video content is not being streamed over the audio-video channel, selection of presentation control 344 may initiate streaming of such audio-video content. Conversely, in an operating state in which audio-video content is being streamed over an audio-video channel to a remote display device, selection of presentation control 344 may stop the streaming of audio-video content.

As a further example of a control that may appear in user interface 300, FIG. 3 illustrates a picture-in-picture control 346. Selection of picture-in-picture control 346 may cause the media control application 220 to generate a command for transmission over a side channel. The command may be formatted in a way recognized by the selected presentation device as a command to create a picture-in-picture display. With a picture-in-picture display format, the audio-video content streamed over the audio-video channel may appear in only one portion of the display of the presentation device. Other portions of the display may be filled with content supplied by the presentation device. In the example of FIG. 1, upon selection of picture-in-picture control 346, television 130 may continue presenting television programming received by television 130 from sources other than computing device 120. Overlaid on that presentation may be a window, presenting video content streamed from computing device 120.

Though, it should be appreciated that the controls illustrated in FIG. 3 are just examples of the types of controls that may be presented by a computing device for the control of a remote presentation device. Other controls, including those now known or hereafter discovered to control televisions or other presentation devices, may be presented by a media control application.

Figure 5:
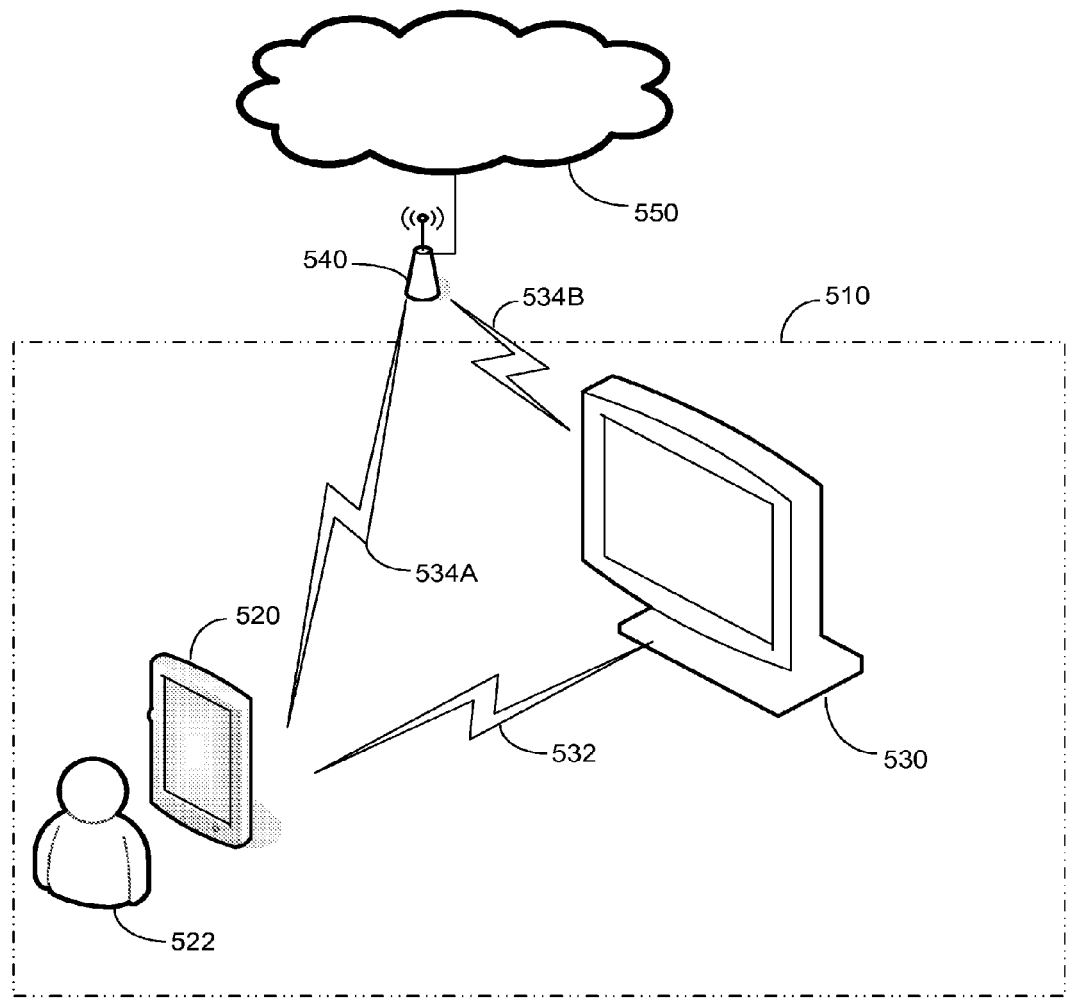
FIG. 5 is a sketch of an environment in which an alternative embodiment of the invention may operation.

Turning to FIG. 5, an alternative embodiment of a system in which a wireless computing device controls an audio-video presentation device is illustrated. In this example, a wireless computing device 520, operated by a user 522, establishes an audio-video channel 532 with a presentation device, here illustrated as television 530. As with the example of FIG. 1, audio-video channel 532 may be formed using frequencies and a protocol as specified in accordance with the Wi-Fi Direct protocol. Though, the specific frequencies use of signal used to form that channel and the protocol used in that channel is not critical to the invention. A media control application executing a computing device 520 may generate a data stream, representing audio-video content for transmission over audio-video channel 532. Additionally, such a media control application may control the operating system of computing device 520 to form a side channel for transmission of commands for television 530.

In the example of FIG. 5, the side channel is formed with links 534A and 534B. Here, link 534A is formed between computing device 520 and an access point 540. Access point 540 may be an access point as is known in the art. For example, access point 540 may be configured to operate according to the known Wi-Fi protocol for infrastructure mode components. In operation, access point 540 may provide a connection to an external network, such as the Internet 550. Additionally, access point 540 may form a local network. In this case, other devices equipped for wireless communication may also connect to that local network through access point 540. In the example illustrated in FIG. 5, television 530 is equipped with a radio that can associate with access point 540 in the same way as computing device 520. Accordingly, television 530 may communicate with access point 540 over link 534B. Links 534A and 534B connect computing device 520 and television 530 in a local network, allowing the devices to exchange information. Accordingly, a side channel may be established over links 534A and 534B. Computing device 520 may use this side channel to transmit commands to television 530. Those commands, for example, may be generated based on user interaction with a media control application. A user may enter such commands through an interface, such as user interface 300 (FIG. 3) or any other suitable interface.

In the embodiment illustrated in FIG. 5, though access point 540 may be located outside of room 510 containing television 530, in this case the transport used to form side channel can communicate over such distances. For example, the Wi-Fi protocol, though designed for communication over relatively short distances, can nonetheless support communications over distances of tens of meters. Though, it should be appreciated that the embodiment of FIG. 5 is just one example of a suitable transport for forming a side channel, and any suitable transport may be used.

In some embodiments, computing device 520 may be configured to support communications over multiple transports, any of which may be used to form a side channel for transmission of commands that control the presentation of audio-video content. Similarly, an audio-video presentation device, such as television 530, may alternatively or additionally be configured to support communication over multiple transports, any one of which may be suitable for forming a side channel. Accordingly, in some embodiments, a computing device and an audio-video presentation device may exchange wireless communications to establish communication over an audio-video channel and an associated side channel. A portion of that interaction may involve selecting a transport mutually supported by the computing device and the audio-video presentation device for use in forming a side channel.

Figure 6:
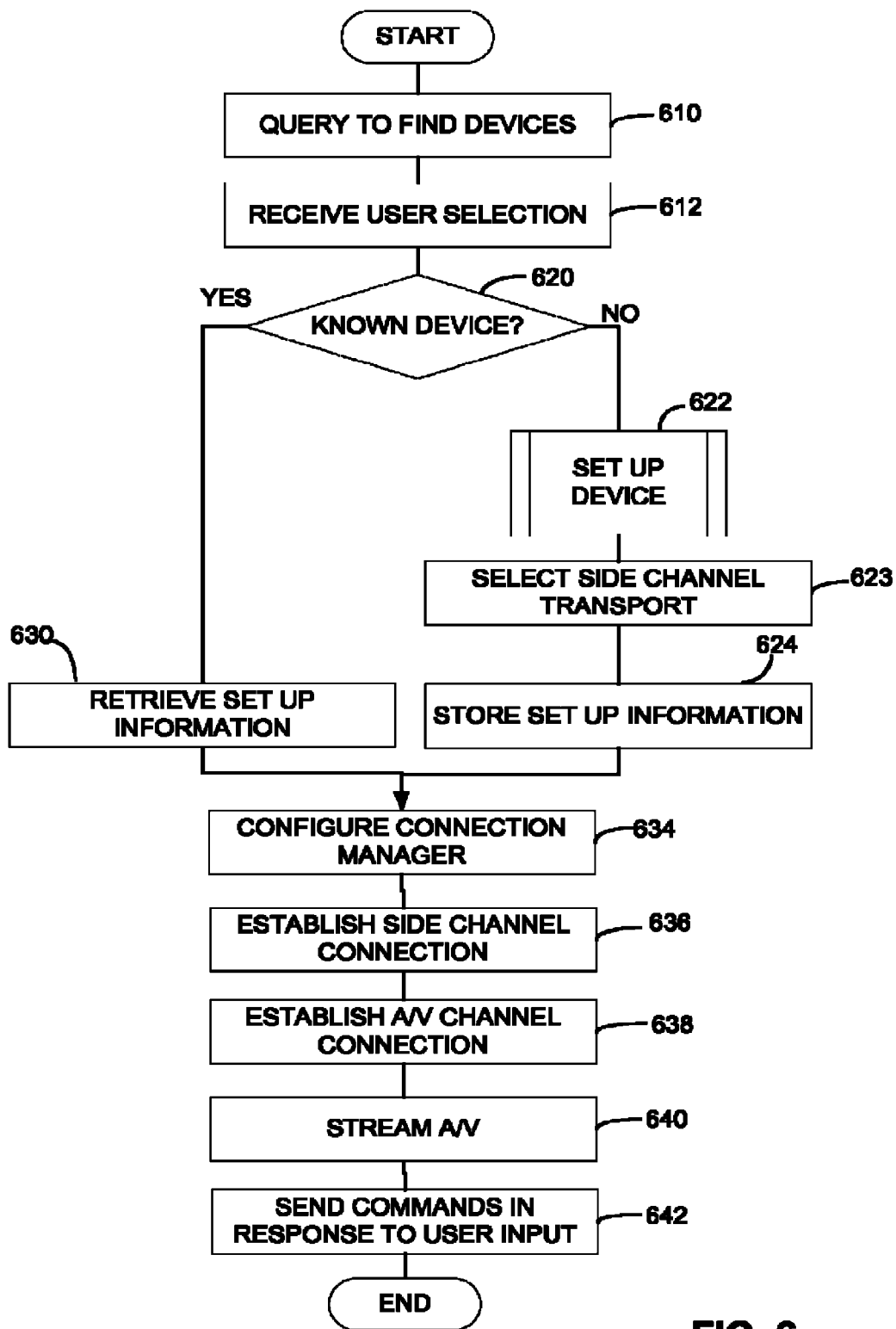
FIG. 6 is a flow chart of an exemplary method of operating a computing device according to some embodiments of the invention.

FIG. 6 illustrates a method of operation of a computing device that may lead to establishing an audio-video channel and a side channel for providing audio-video content and associated presentation commands to a presentation device, such as a television. The method of FIG. 6 may begin in response to any suitable trigger. As one example, the method may be triggered by user input. For example, for a computing device such as computing device 210 executing a media control application 220 that presents a graphical user interface 300, the trigger may be a user input selecting a control, such as device control 342 (FIG. 3).

Regardless of the trigger, the computing device may transmit a message requesting devices that may operate as a presentation device to respond. The specific format of such a request message may depend on the protocol with which the computing device elects to form a connection to act as an audio-video channel. In the case of a computing device configured to use the Wi-Fi direct protocol to establish an audio-video channel, the request message sent at block 610 may be formatted as a probe request message formatted for device or service discovery. If a service discovery message is used, the message may indicate that the computing device is searching for a remote device that can act as a presentation device for audio-video content. In scenarios in which the audio-video content is audio only, the service discovery request may indicate a desired service appropriate for presentation of audio information. If the audio-video content to be presented is a video only, the service discovery request may request a device providing a service appropriate for presentation of video content. If the audio-video content is multimedia content, the service discovery request may request a service suitable for presentation of multimedia content. Though, as illustrated by the exemplary interface 400 (FIG. 4), it is not a requirement that a computing device automatically identify a type of audio-video presentation device. Rather, if multiple audio-video presentation devices respond to the request transmitted at block 610, a user may be presented by a menu of available devices, allowing the user to select a desired device.

Regardless of the nature of the request transmitted at block 610. The process may proceed to block 612. At block 612, a user may indicate a selection of a device with which to form an audio-video channel and a side channel. Even in scenarios in which a computing device automatically identifies a single audio-video presentation device, the user may nonetheless be offered an opportunity to make a selection at block 612 to indicate whether the user desires to have a connection at all. Though, it should be appreciated that the specific mechanism by which a remote device is selected is not critical to the invention.

Regardless of the manner in which the remote device is selected, the process may proceed to decision block 620. At decision block 620, the process may branch, depending on whether the selected remote device is a known device. A device may be known to the computing device executing the process of FIG. 6 if the computing device has previously formed a connection with that remote device and stored information used in establishing that connection. If no information has been previously stored, the process may branch from decision block 620 to subprocess 622.

At subprocess 622, the computing device may exchange wireless communications with the remote device to set up the remote device for communication over an audio-video channel and an associated side channel. The specific steps at subprocess 622 may depend on the protocol being used by the computing device for establishing a connection with the remote device. In this example, the steps of subprocess 622 may be based on the protocol used for establishing the audio-video channel. As a specific example, the audio-video channel may be established using the Wi-Fi Direct protocol. In that scenario, the steps of subprocess 622 may implement a pairing ceremony as defined in accordance with the Wi-Fi Direct protocol. Though, it should be appreciated that any suitable steps leading to an exchange of information allowing the computing device and the remote presentation device to form a connection may be used.

Such communication, for example, may entail exchange of a password, challenge code or other suitable security information between the computing device and the remote device. The devices may obtain such security information in any suitable way. For example, a password may be obtained by user input on the computing device. A user may obtain such a password from the manufacturer of the remote device. For example, devices equipped for wirelessly forming connections may be packaged with instructions providing the password or may be configured to enter an operating mode in which the device displays the password for the user to observe. Alternatively, the same password may be established and entered at both devices by the user. Requiring a password as part of the pairing ceremony may ensure that the computing device pairs with the intended presentation device.

In addition to exchanging a password, the computing device and remote presentation device may exchange other information useful in establishing one or more wireless links to carry an audio-video channel and/or a side channel between the devices. Though any suitable mechanism may be used to convey this information, in some embodiments, additional information may be conveyed in information elements associated with messages that are otherwise prescribed as part of the protocol to be used as a transport for the audio-video channel. Information elements allow information not specifically provided for as part of a standardized protocol to be inserted into messages that are formatted according to the standardized protocol. In this way, many types of information may be communicated between the computing device and remote presentation device while still using a standardized protocol.

As an example of the types of additional information that may be exchanged, each device may reveal to the other information about alternative transports supported by that device and available for use in establishing a side channel. Additionally, the information exchanged may reveal information about capabilities of the remote presentation device to present audio-video content. Such information, for example, may identify information about the remote presentation device, such as the types of codecs supported, the resolution of a display screen or the size of a display screen. In some embodiments, the information exchanged between the computing device and the remote display device may indicate steps to be performed as part of the pairing ceremony. As one example, some wireless devices support a standard called Wi-Fi protected setup (WPS), which entails multiple methods. The information exchanged between the devices may identify specific WPS methods supported by the devices. Though, any suitable information that may be used in setting up the devices may be used.

Regardless of the specific information exchanged between the computing device and remote presentation device, each device may be configured with a processor that analyzes the information to identify values for one or more parameters used in establishing communication between the devices. For example, at block 623, the computing device may select a transport for use in forming a side channel. As one example of how this selection could be made, each device may maintain an ordered list of possible transports for use in establishing a side channel. These lists may be exchanged such that both devices have both tests. Each device may process the lists to identify transports that are supported by both devices. Of those mutually supported transports, a metric, representing the position on both lists may be and the transport with the highest value of the computed metric may be selected for implementing the side channel. Similar negotiation strategies may be performed to select values of other parameters for which information is exchanged. Such processing may be performed using techniques as are know in the art or in any other suitable way.

Regardless of the nature of the information exchanged during subprocess 622, upon completion of subprocess 622, each device will have set up information usable for establishing a connection over which the audio-video channel may be communicated.

At block 624, that information may be stored. On the company device that information may be stored in connection with a designation of the remote presentation device.

Though not expressly illustrated in FIG. 6, complementary operations may be performed on the remote presentation device, resulting in set up information being available on that device too. Storing the information at block 624 allows a connection to the remote presentation device to be formed at a later time without repeating subprocess 622. Accordingly, in instances in which the process of FIG. 6 is executed when that information has been previously stored, the process will branch from decision block 620 to block 630, bypassing subprocess 622. At block 630, information stored at block 624 in a prior iteration of the process may be retrieved.

Regardless of whether set up information is retrieved at block 630 or generated as part of subprocess 622, the process of FIG. 6 may proceed to block 634. Starting at block 634, the computing device may be internally configured to route information over the selected connections for the audio-video channel and the side channel. Such processing may be performed using techniques as are known in the art. For example, processing at block 634 may entail providing an instruction to a known component of the operating system, sometimes called a connection manager, to establish a connection for the audio video channel and side channel.

Accordingly, at block 636, the connection manager may establish a connection used for the side channel over the transport selected at block 623.

At block 638, the connection manager may configure the computing device to communicate over the audio-video channel. The processing at blocks 636 and 638 may entail steps as are known in the art for establishing connections over the identified transports. This processing may include configuring a driver, a radio and/or other components of the computing device. This process may result in a network adapter being exposed through which the side channel or audio video channel can be accessed. Accordingly, the specific processing at steps 636 and 638 may depend on the transports identified.

Regardless of the manner in which the transports for an audio-video channel and a side channel are established, processing may proceed to block 640. At block 640, computing device may stream data representing audio-video content over the established audio-video channel. The audio-video content stream at block 640 may be generated in any suitable way. In the example of a computing device 210 (FIG. 2) containing a media control application, the audio-video content may be generated by that application in response to user inputs. Though, the specific mechanism by which the data stream is generated is not critical to the invention.

The mechanism by which the data representing audio-video content is injected into the audio-video channel for transmission also is not critical to the invention and may be performed using techniques as are known in the art. For example, a connection manager within an operating system may establish a network adapter coupled to the audio-video channel. A controlling application, such as a media control application may place calls on such a network adapter, providing the data for transmission. Though, any other suitable techniques may be used.

Processing in FIG. 6 also may entail sending commands in response to user input at block 642. The user input may be obtained in any suitable way. When the computing device is configured with a media control application presenting a user interface, such as user interface 300 (FIG. 3), the commands to be transmitted may be identified based on user input provided through such a user interface. The specific format of the commands also is not critical to the invention. The transmitted commands may be in format mutually recognized by the computing device and the remote presentation device.

The specific mechanism by which the commands are injected into the side channel for transmission also is not critical to the invention. As one example, techniques as are known in the art may be employed. A connection manager, upon establishing a connection to be used for the side channel, may provide a network adapter associated with that connection. A media control application, or other component generating commands, may place a call on such a network adapter, providing data representing a command to be transmitted. In response to such a call, a command may be transmitted over the side channel.

Figure 7:
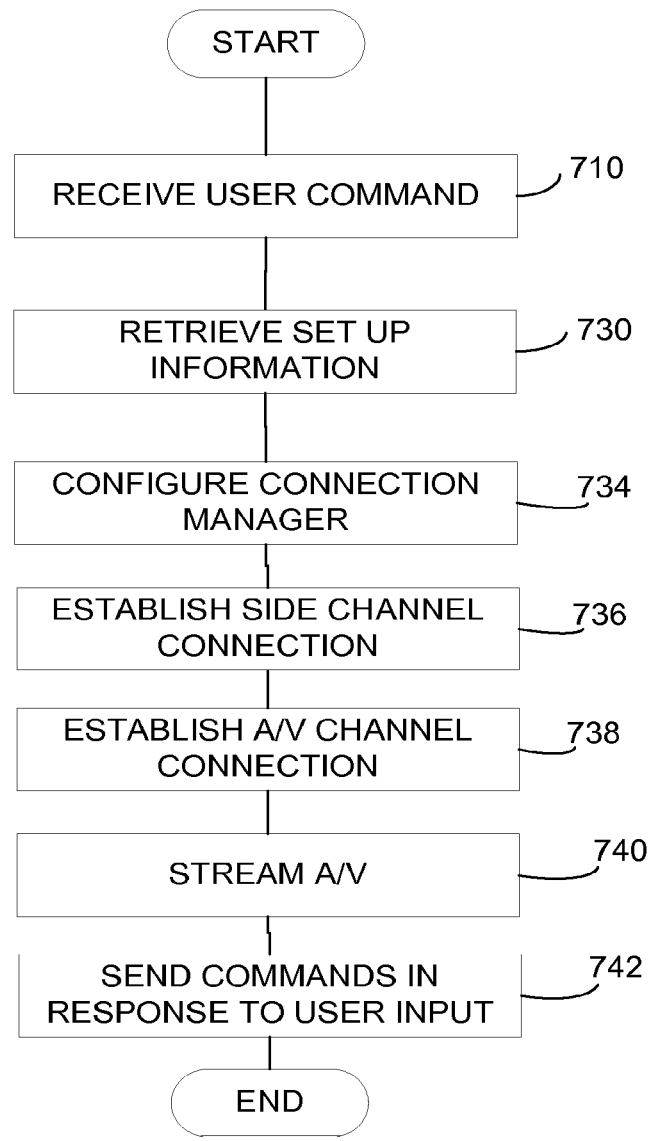
FIG. 7 is a flow chart of an alternative method of operation of a computing device.

It should be appreciated that FIG. 6 represents an exemplary process for operating a computing device. Different processes may be used on different computing devices. Moreover, different processes may be performed in different modes of operation of the same computing device. FIG. 7 provides an example of an alternative process of operating a computing device. In this example, processing is performed within an operating system utility. The process of FIG. 7 may be initiated in response to a user input received when the computing device has already stored setup information for a remote audio-video presentation device that is in the vicinity of the computing device. As an example, an operating system of computing device may respond to a prescribed keystroke sequence or other input entered into the computing device by executing the process illustrated in FIG. 7. As a specific example, a computer executing the WINDOWS® operating system may be configured to respond to a keystroke combination involving a special "WIN" key and the key associated with the letter "P." Such a keystroke sequence may trigger use of a nearby, known remote presentation device as an output device presenting any information appearing on the screen of the computing device.

Accordingly, the process of FIG. 7 may begin at block 710 when the keystroke sequence is detected. Upon receipt of that keystroke sequence, the process may proceed to block 730. At block 730, a utility executing within the operating system may retrieve setup information for a previously identified device. That setup of information may include any passwords or other information used in establishing a connection to that device. Additionally, that setup information may include identification of transports used for forming an audio-video channel and a side channel.

At block 734, a connection manager may use the retrieved setup information to establish a side channel connection. At block 738, the connection manager may use the retrieved information to establish a connection for the audio-video channel. Processing at blocks 734, 736 and 738 may be similar to the processing performed at blocks 634, 636 and 638, respectively. Though, rather than the connection manager responding to commands from a media control application, the commands may be provided by the utility of the operating system invoked in response to the user input at block 710.

Once the computing device is configured for communication with the remote presentation device, the process may proceed to block 740. At block 740, data representing a stream of audio-video information may be conveyed over the audio-video channel. The processing at block 740 may be similar to the processing at block 640. However, in the example of FIG. 7, rather than streaming data generated directly by a media control application, any data captured by the operating system utility may be streamed over the audio-video channel. In this example, that data may represent information appearing on a display screen of the computing device and the remote display utility may capture this information from other components that control the display of the computing device.

Processing at block 742 may result in transmission of commands, similar to the processing at block 642. Though, rather than having the commands being generated in response to user input received through a media control application, the commands may be transmitted in response to user input received through the operating system utility invoked at block 710.

Figure 8:
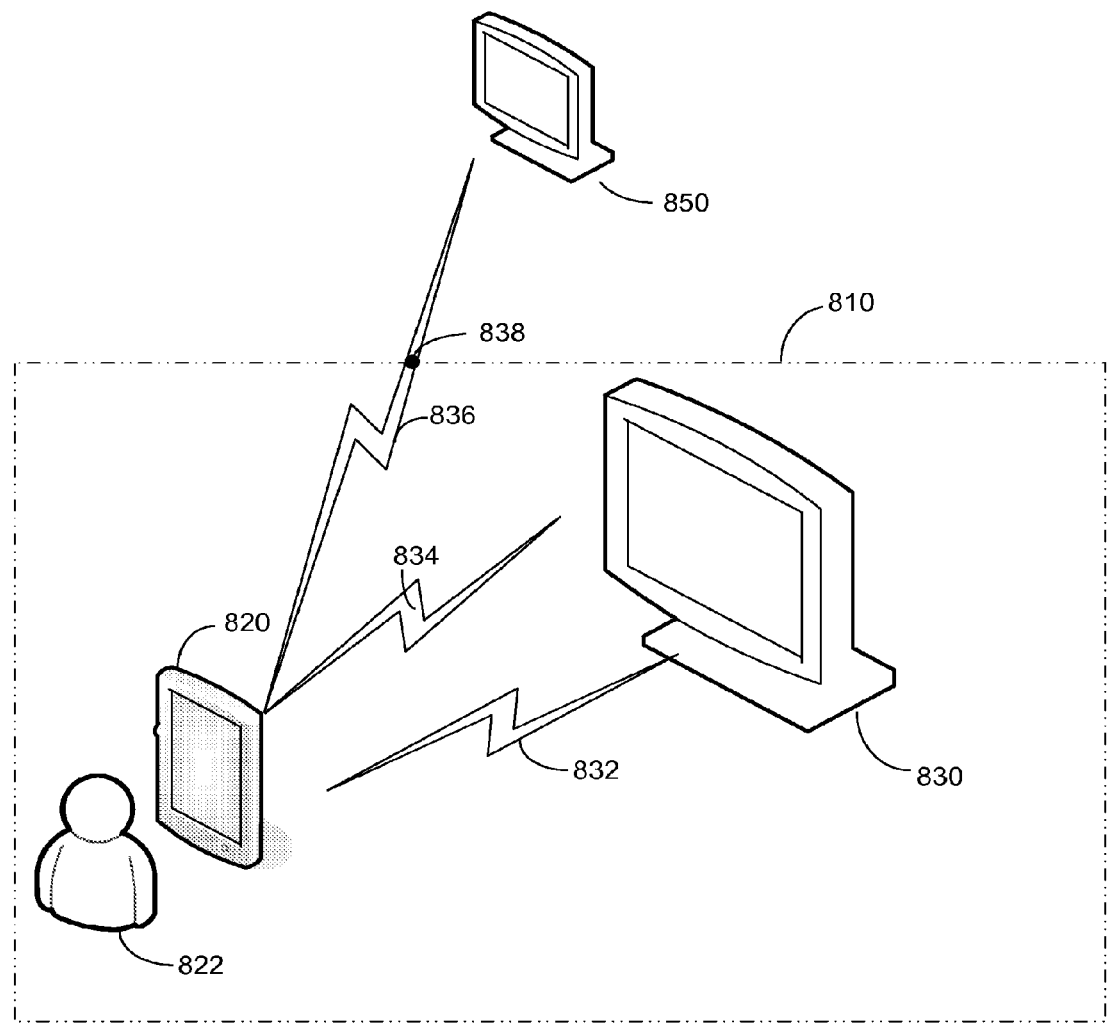
FIG. 8 is a sketch of an environment in which a further alternative embodiment of the invention may operate.
Figure 9:
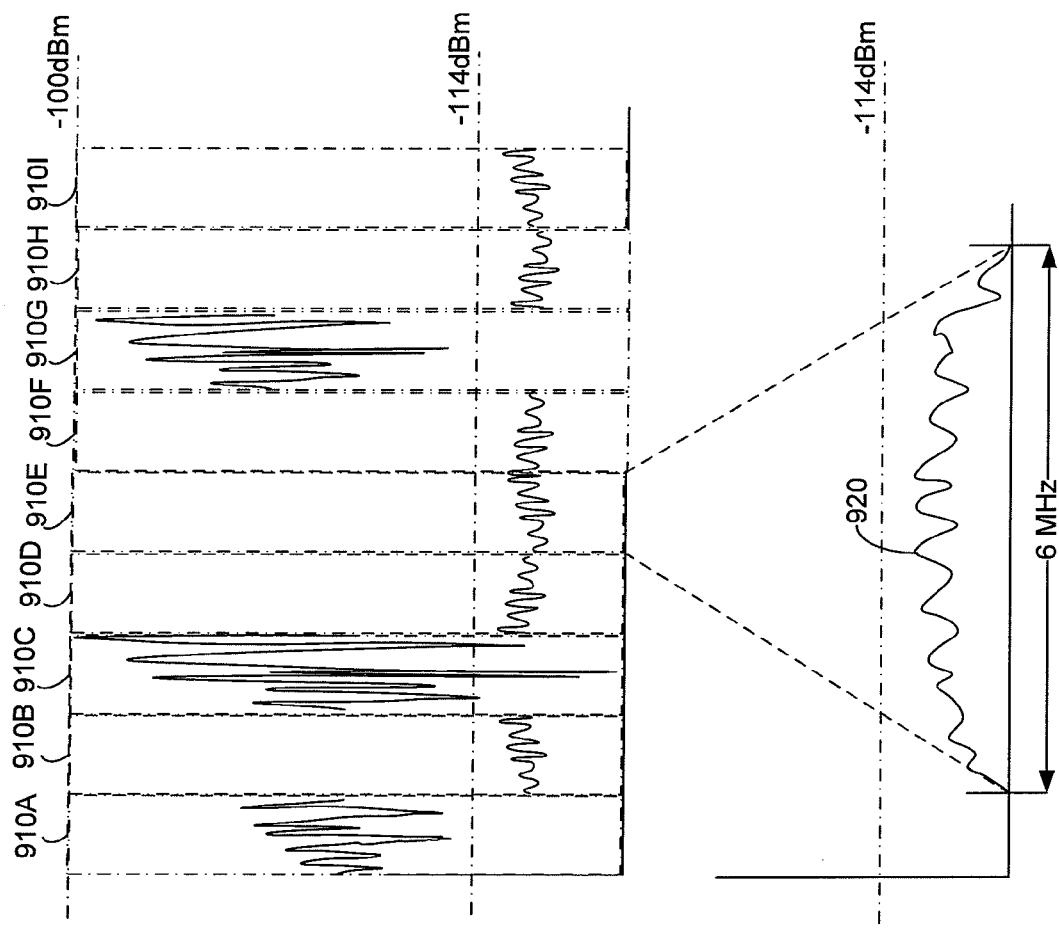
FIG. 9 is a sketch representing signals within the digital TV spectrum according to some exemplary embodiments of the invention.

FIGS. 8 and 9 illustrate yet a further alternative embodiment. As in the embodiments depicted in FIGS. 1 and 5, the illustrated embodiment in FIG. 8 includes a computing device 820 and a television 830, serving as an example of an audio-video presentation device. Also as in the prior examples, an audio-video channel 832 and a side channel 834 are formed. Audio-video channel 832 may use as a transport a link formed using any suitable frequencies and protocols. As an example, audio-video channel 832 may be formed using a peer-to-peer connection. Such a connection may be formed, for example, using the Wi-Fi Direct protocol or any other suitable protocol.

In this example, side channel 834 may use as a transport a link formed in the digital TV spectrum. It is known that computer based communications may be performed using white space in the digital TV spectrum. The white space represents frequencies that are not licensed to any entity for use in a geographic area in which the computer-based communications are to occur. Such white space communication, however, requires that a computing device identify an unused portion of the digital TV spectrum.

In some scenarios, a computing device configured for communication in the digital TV spectrum may be programmed to access a database of licensed digital TV channels by location. Prior to communicating using frequencies in a digital TV spectrum, the computing device may access the database to identify an unused channel.

The computing device may access the database in any suitable way. For example, the computing device may store a copy of the database or may access a server or other centralized location from which information on channel assignments is available.

Alternatively, the computing device may detect white space by sensing power levels in various channels of the digital TV spectrum to identify an unused channel. FIG. 9 is a graph illustrating power levels in a portion of the digital TV spectrum. In this example, the portion of the spectrum is divided into channels 910A, 910B . . . 910I. Each of the channels 910A, 910B . . . 910I, for example, may be 6 MHz wide.

FIG. 9 illustrates a noise threshold of −114 dBm. This threshold indicates the lower limits of the signal strength that a digital television receiver is expected to respond to. Signals with powers below this level may not be detected and may instead be regarded as noise. Channels having signal power levels below this threshold are regarded as not being in use to transmit digital TV signals. In the scenario illustrated in FIG. 9, channels 910A, 910C and 910G are shown with power levels indicating that those channels are in use carrying digital TV signals. In contrast, channels 910B, 910E, 910F, 910H and 910I are shown carrying signals with power levels below the noise threshold, indicating that those channels are not in use carrying digital TV signals.

Accordingly, by sensing the power level in a digital TV channel to identify a channel with a power level below a noise threshold, computing device 820 may identify a white space channel to use in forming side channel 834. Once the side channel is formed, computing device 820 may encode commands to television 830 in any suitable format and transmit them using frequencies in the identified white space channel of the digital TV spectrum. Because computing device 820 is transmitting in white space of a digital TV spectrum, radiation 836 associated with those side channel communications that may reach other nearby televisions, such as television 850, will not interfere with operation of television 850. Television 850 will not be attempting to receive digital television programming on the same channel on which side channel communications are being transmitted because that white space channel is not being used in the geographic area where television 850 is located. Accordingly, even if the transmitted power level in the white space channel exceeds the noise threshold, here −114 dBm, normal operation of television 850 is not disrupted.

However, in some embodiments, it may be difficult or expensive to identify a white space channel. Identifying a channel may require, for example, a sensitive receiver, capable of distinguishing between power levels above −114 dBm and below −114 dBm. Such sensitive receivers may be expensive. Also, equipping a computing device such that it has access to an up-to-date database of licensed TV channels and to determine its location such that it can make use of information in such a database may be expensive or present logistical difficulties. Accordingly, in some embodiments, computing device 820 may form a side channel in the digital TV spectrum without regard to whether the side channel is using frequencies in a white space channel. Though, to avoid interference with other devices, computing device 820 may transmit using power levels that are low enough that any radiation associated with those transmissions does not interfere with nearby televisions, such as television 850. In some embodiments, the power selected for transmission may be below a regulatory power threshold for detecting incumbent users of the channel.

To achieve that result, the power level of radiation 836 reaching a nearby device should be less than the noise threshold, which in the example of FIG. 9 is −114 dBm.

Accordingly, in some embodiments, computing device 820 will be configured to control a radio used for side channel 834 to transmit at a power level such that radiation 836 reaching boundary 838 of room 810 has a level of −114 dBm or less.

Such a power level at boundary 838 may be achieved, for example, by transmitting at a power level on the order of 0 dBm or less. The propagation loss between computing device 820 and boundary 838 may be on the order of 100 dBm, such that this transmit power level may ensure that the power of radiation 836 reaching television 850 is low enough that radiation 836 does not interfere with the operation of television 850.

Though, the signal received by television 830 must nonetheless be sufficiently recognizable that television 830 can make use of information conveyed in side channel 834. To enable such communications, digital computing device 820 may use encoding and modulation techniques that provide processing gain for a device, such as digital television 830, employing converse decoding and demodulation techniques. As an example, computing device 820 may transmit signals representing commands in side channel 834 using a spread spectrum modulation technique.

FIG. 9 illustrates a spread spectrum signal 920 transmitted in channel 910E. Signal 920 is transmitted with a power level such that, upon reaching digital television 830, the power is below the threshold deemed to represent noise. However, as is known in the art, spread spectrum demodulation aggregates the power across the channel such that a receiver using a spread spectrum demodulator matched to the spread spectrum modulator of the transmitting device can aggregate the power of the signal 920 into a more powerful signal. The receiver then may detect and extract information from the signal. As an example, a spread spectrum demodulator may have the effect of adding on the order of 20 dB of gain or more to a signal. Accordingly, signal 920, though illustrated in FIG. 9 as being below the noise threshold, may, following processing in a spread spectrum demodulator, produce an output above the threshold of detectability.

Though a receiver using a spread spectrum demodulator can detect spread spectrum signal 920, receivers using other types of demodulators perceive signal 920 as noise below the noise threshold. Moreover, though FIG. 9 illustrates that spread spectrum signal 920 is spread across one channel, in some embodiments, the signal may be spread across multiple channels to achieve even further processing gain. Accordingly, by using such low power transmission and modulation techniques that provide gain, frequencies in the digital TV spectrum can be used to form side channel 834 without causing interference with digital TV receivers.

To further enhance communication in a side channel using such low power, a forward error control code may be used to encode digital data representing commands. For example, forward error control coding may include at least one additional bit of error correction for each bit of data transmitted. Though, in some embodiments, even lower coding rates may be used, such as two bits or more of error correction for each bit of data.

Such low rate error correcting codes, with ratios of one-to-one or one-to-two or even lower, may allow reliable communication of commands, even at low power levels. Though in some scenarios increasing the total number of bits transmitted may be undesirable, in the scenario illustrated in FIG. 8, the commands are communicated over the side channel require few data bits. Adding bits for error control still results in a relatively low number of bits transmitted over side channel 934. For example, data representing commands, including error correcting bits, may be transmitted at a rate of 56 kilobits per second or less. In some embodiments, the data rate may be lower, such as 32 kilobits per second or less. In many embodiments, these bit rates are below the channel capacity of the side channel.

Though FIG. 9 illustrates a scenario in which signal 920, representing commands transmitted in side channel 834, is in a white space channel, it is not a requirement that signal 920 be transmitted in a white space channel. Signal processing techniques may be used to differentiate the side channel signals from the digital TV signals. As shown in FIG. 9, even channels 910A, 910C and 910G, which contain digital TV signals, have a relatively low power level. In the example of FIG. 9, channels 910A, 910C and 910G have a power level below a second threshold, which is indicated here to be approximately −100 dBm. A remote audio-video presentation device, such as television 830 intended to receive signal 920 in side channel 834 may adequately detect signal 920 if the level of the received signal exceeds the level of the digital TV signal sufficiently in the channel in which signal 920 is transmitted.

Though the average power level of signal 920 as shown in FIG. 9 is below −114 dBm, when demodulated with a spread spectrum demodulator, that signal level may effectively increase by the gain provided by the demodulation technique. Spread spectrum demodulation operating over a bandwidth on the order of 6 MHz as indicated in FIG. 9 may provide a gain in excess of 20 dB. Accordingly, a signal level initially below the noise threshold may be increased to be above a level of digital TV signals in that band.

As a specific numeric example, FIG. 9 shows that each of the digital TV channels in use, channels 910A, 910C and 910G, the average power level of the digital television signals is below −100 dBm. Though signal 920 has a power level below −114 dBm, approximately −120 dBm in the example illustrated, adding gain in excess of 20 dB to such a signal through demodulation will produce a signal with an effective power level above −100 dBm, making the signal above the power level of the digital television signals in each of the occupied channels. The transmission parameters of signal 920 may be designed such that the effective power level of the demodulated signal is sufficiently above the average power level of digital television signals in the occupied digital TV channels to enable reliable detection. The parameters, for example, may be selected such that the effective power level of the demodulated signal 920 is more than 3 dB above the average power level of the digital TV signals at the remote presentation device. It should be appreciated that the numeric examples provided herein are for illustration only, and in other embodiment other signal levels may exist. Nonetheless, the relative signal levels may still be such that detection of side channel communications occurs within interference with digital TV receivers. A radio as known in the art may be constructed to detect a signal under these conditions such that computing device 820 and television 830 may communicate over side channel 834 formed using frequencies in the digital television spectrum without regard to whether the frequencies used for communication are within a white space channel of the digital TV spectrum.

Figure 10:
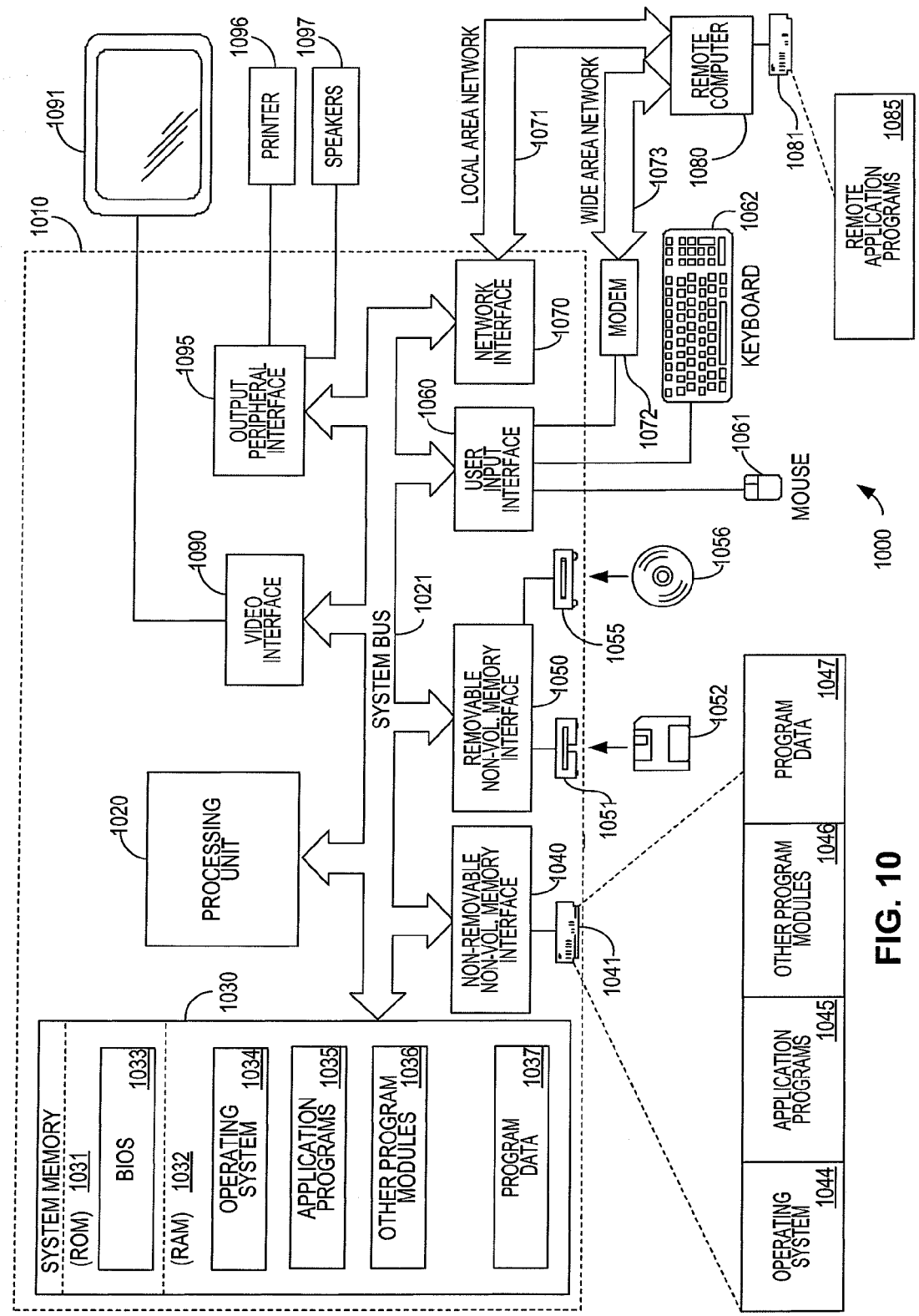
FIG. 10 is a functional block diagram of a computing device that may be used in implementing some embodiments of the invention.

FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

As an example, it was described that control of a remote audio-video presentation device was provided within a media control application executing on a computing device. It is not a requirement that control of the remote audio-video presentation device be provided through a media control application. Such control may alternatively or additionally be provided through an operating system. Because the operating system of a computing device provides services for presenting audio-video information on a display and through speakers of the computing, the operating system may intercept and, if appropriate, redirect, audio video content to a remote presentation device. In such a scenario, a user interface for selection and control of the aspects of the presentation of audio-video content may be provided by a conventional media control application.

To implement other functions for control of the remote presentation device, the operating system may provide a utility that may be invoked by the user. Such a utility, for example, may allow any audio or video content that could be rendered locally on the computing device to be redirected to a nearby device acting as a display device. For example, the user impression conventionally presented through the "desktop" of a computing device, along with any content provided by any application that appears to be executing on the desktop, may be transmitted to a nearby display device. Such a utility may allow a user to control any aspect of that presentation, such as the volume or whether it is presented in a full screen mode or embedded in another image on the presentation device.

As another example, it was described that low power transmissions are used in the digital TV spectrum to implement a side channel for commands to control a remote presentation device. Similar techniques may be used to form side channels for other purposes. Moreover, such techniques may be used for low bit rate communication, such as 56K bps or less.

Also, in some embodiments channels are said to be formed over connections. Use of the word "connection" is not intended to connote that a protocol that maintains a stateful connection is used. Protocols which are sometimes referred to as "connectionless" may also be used. Here a "connection" indicates only that sufficient information to engage in communication is available. For example, a UDP protocol, which is sometimes described as connectionless, or other suitable protocol, may be used.

Further, example embodiments were described in relation to a computing device that generates audio-video content and commands. Components to establish such channels may exist in a remote presentation device, through in some embodiments, simpler components may be used. For example, a presentation device may have one or more radios, like radios 250 and 254. A remove presentation device may have a controller like processing unit 1020. Though such a controller may support fewer functions than a general purpose CPU, it may nonetheless control the device to perform a pairing ceremony. Also it may also direct data representing content for presentation and control the device to respond to commands received over the side channel.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of controlling presentation of audio-video content on a presentation device by a wireless computing device, the method comprising:
   discovering, via a device discovery process and/or a service discovery process executing on the wireless computing device, a plurality of presentation devices capable of presenting the audio-video content;
   displaying representations of the plurality of presentation devices in a graphical user interface of the wireless computing device;
   receiving an indication of a user selection of a presentation device of the plurality of presentation devices;
   establishing a first communications channel with the indicated presentation device;
   establishing a second communications channel with the indicated presentation device, the second communications channel employing a different protocol from that of the first communications channel, at least one different transmission parameter from that of the first communications channel, and a different radio of the wireless computing device from that used for the first communications channel;
   streaming the audio-video content from the wireless computing device to the indicated presentation device over the first communications channel for presentation on the indicated presentation device while a video portion of the audio-video content is being displayed in the graphical user interface of the wireless computing device;
   receiving a user request for modification of the presentation of the streamed audio-video content on the indicated presentation device, the user request representing a request to change at least one characteristic of the presentation of the streamed audio-video content on the indicated presentation device;
   formatting a command for transmission to the indicated presentation device over the second communications channel; and
   transmitting the command to the indicated presentation device over the second communications channel.

2. The method of claim 1, wherein the method further comprises:
   receiving the audio-video content via an Internet connected wireless network access point.

3. The method of claim 1, wherein the at least one characteristic of the presentation of the streamed audio-video content includes an audio characteristic and/or a video characteristic.

4. The method of claim 1, wherein communications protocols for the first communications channel and for the second communications channel are peer-to-peer communications protocols.

5. The method of claim 1, wherein establishing the second communications channel includes:
   identifying a transport; and
   configuring a driver and a radio of the wireless computing device based at least in part on the identified transport.

6. The method of claim 1, wherein the audio-video content includes a representation of at least a window of the graphical user interface of the wireless computing device.

7. The method of claim 1, wherein the first communication channel is a Wi-Fi Direct connection between the wireless computing device and the indicated presentation device, and wherein the wireless computing device is a Wi-Fi Direct group owner for the Wi-Fi Direct connection and the indicated presentation device is a Wi-Fi Direct client for the Wi-Fi Direct connection.

8. The method of claim 1, further comprising:
   receiving the audio-video content over a different radio than that used by the wireless communications device for the first communications channel.

9. A computer readable memory encoded with computer-executable instructions that, when executed, perform operations for the presentation of content by a presentation device, the operations comprising:
   receiving, by the presentation device, a request for a device discovery response and/or a service discovery response from a wireless computing device;
   in response to the received request, transmitting an indication that the presentation device is capable of presenting the audio-video content;
   in response to a user request received via the wireless computing device, establishing a first communications channel with the wireless computing device;
   establishing a second communications channel with the wireless computing device, the second communications channel employing a different protocol from that of the first communications channel and at least one different transmission parameter from that of the first communications channel;
   receiving the audio-video content in a stream from the wireless computing device over the first communications channel for presentation on the presentation device while a video portion of the audio-video content is being displayed in a graphical user interface of the wireless computing device;
   presenting the received audio-video content on the presentation device;
   receiving a command that is formatted by the wireless computing device, the command requesting a modification of a manner in which the streamed audio-video content is being presented on the indicated presentation device; and in response to the received command, modifying the manner in which the streamed audio-video content is being presented on the presentation device.

10. The computer readable memory of claim 9, wherein modifying the manner in which the streamed audio-video content is being presented on the presentation device includes:

changing at least one audio or video characteristic of the presentation of the streamed audio-video content on the presentation device.

11. The computer readable memory of claim 9, wherein communications protocols for the first communications channel and for the second communications channel are peer-to-peer communications protocols.

12. The computer readable memory of claim 9, wherein the audio-video content includes a representation of at least a window of a graphical user interface of the wireless computing device.

13. The computer readable memory of claim 9, wherein the first communication channel is a Wi-Fi Direct connection between the wireless computing device and the indicated presentation device, and wherein the wireless computing device is a Wi-Fi Direct group owner for the Wi-Fi Direct connection and the indicated presentation device is a Wi-Fi Direct client for the Wi-Fi Direct connection.

14. The computer readable memory of claim 9, wherein the second communication channel is a Bluetooth connection between the wireless computing device and the presentation device.

15. A wireless computing device, comprising:

a wireless radio;

a processor; and a memory, wherein the processor and the memory respectively store and execute instructions for causing the wireless computing device to perform operations that cause audio-video content to be remotely presented, the operations including:

discovering, via a device discovery process and/or a service discovery process executing on the wireless computing device, a plurality of presentation devices capable of presenting the audio-video content;

establishing a first communications channel over the radio with a user selected presentation device of the plurality of presentation devices capable of presenting the audio-video content;

establishing a second communications channel with the user selected presentation device, the second communications channel employing at least one different transmission parameter from that employed for the first communications channel;

streaming the audio-video content from the wireless computing device to the user selected presentation device over the first communications channel for presentation on the user selected presentation device while a video portion of the audio-video content is being displayed in a graphical user interface of the wireless computing device;

receiving a user request for modification of a manner in which the streamed audio-video content is being presented on the user selected presentation device;

formatting a command for transmission to the user selected presentation device over the second communications channel; and transmitting the command to the user selected presentation device over the second communications channel.

16. The wireless computing device of claim 15, further comprising:

another wireless radio, wherein the second communications channel is carried over the other radio, the first communications channel is a Wi-Fi Direct communications channel, and the second communications channel is a Bluetooth communications channel.

17. The wireless computing device of claim 15, wherein communications protocols for the first communications channel and for the second communications channel are peer-to-peer communications protocols.

18. The wireless computing device of claim 15, wherein the audio-video content includes a representation of at least a window of a graphical user interface of the wireless computing device.

19. The wireless computing device of claim 15, wherein the operations further include:

establishing a third communications channel to the Internet via an Internet connected network access point; and receiving the audio-video content via the third communications channel.

20. The wireless computing device of claim 15, further comprising:

another wireless radio, wherein the operations further include:

establishing a third communications channel using the other wireless radio; and receiving the audio-video content via the third communications channel using the other wireless radio.

* * * * *